(12) United States Patent
Raghavan et al.

(10) Patent No.: US 12,503,692 B2
(45) Date of Patent: Dec. 23, 2025

(54) SYSTEMS AND METHODS OF FORMING HYDROGEL STRUCTURES AND STRUCTURES FORMED THEREFROM

(71) Applicant: University of Maryland, College Park, College Park, MD (US)

(72) Inventors: Srinivasa R. Raghavan, Columbia, MD (US); Sohyun Ahn, College Park, MD (US); Ankit Gargava, College Park, MD (US)

(73) Assignee: University of Maryland, College Park, College Park, MD (US)

( * ) Notice: Subject to any disclaimer, the term of this patent is extended or adjusted under 35 U.S.C. 154(b) by 1042 days.

(21) Appl. No.: 17/235,394

(22) Filed: Apr. 20, 2021

(65) Prior Publication Data

US 2021/0324365 A1 Oct. 21, 2021

Related U.S. Application Data

(60) Provisional application No. 63/012,695, filed on Apr. 20, 2020.

(51) Int. Cl.
*C12N 11/04* (2006.01)
*B29C 39/00* (2006.01)
(Continued)

(52) U.S. Cl.
CPC ............ *C12N 11/04* (2013.01); *B29C 39/003* (2013.01); *B29C 39/02* (2013.01); *B29C 39/36* (2013.01);
(Continued)

(58) Field of Classification Search
CPC .... C12N 11/04; C12N 11/10; C12N 15/1006; B29C 39/003; B29C 39/02; B29C 39/36; C25D 1/00; C25D 1/18; B29K 2105/0061; B29K 2995/0056; G01N 33/5438; C09D 105/04; B01J 2219/00576; B01J 2219/00641; B01J 2219/00644; B01J 2219/00653; B01J 2219/00743; B01J 2219/00725; B01J 19/0046; B01J 2219/0072; B01J 2219/00527; B01J 2219/00585; B01J 2219/00596; B01J 2219/00605; B01J 2219/00612;
(Continued)

(56) References Cited

U.S. PATENT DOCUMENTS

2002/0031813 A1* 3/2002 Ozkan ................. B01J 19/0046
435/283.1
2012/0103822 A1* 5/2012 Shi ..................... G01N 33/5438
435/7.1

OTHER PUBLICATIONS

Agulhon, P., et al. (2012) "Structural Regime Identification in Ionotropic Alginate Gels: Influence of the Cation Nature and Alginate Structure," Biomacromolecules 13: 215-220.
(Continued)

*Primary Examiner* — Xiuyu Tai
(74) *Attorney, Agent, or Firm* — HYLTON-RODIC LAW PLLC

(57) ABSTRACT

A method of system of forming a biopolymer hydrogel structure includes a mold loaded with a cation. At least a portion of the surface of the mold is exposed to a solution comprising a gellable polymer such as alginate. An electric potential is applied to the mold so that the cation therein and the gellable polymer migrate via electrophoresis toward the surface portion, thereby interacting and forming a hydrogel structure adjacent to the surface portion.

20 Claims, 12 Drawing Sheets

(a) Photo of setup (b) Schematic of setup (c) Result: Alg-gel layer

(51) Int. Cl.
| | |
|---|---|
| B29C 39/02 | (2006.01) |
| B29C 39/36 | (2006.01) |
| C12N 11/10 | (2006.01) |
| C25D 1/00 | (2006.01) |
| C25D 1/18 | (2006.01) |
| B29K 105/00 | (2006.01) |

(52) U.S. Cl.
CPC ............... C12N 11/10 (2013.01); C25D 1/00 (2013.01); C25D 1/18 (2013.01); B29K 2105/0061 (2013.01); B29K 2995/0056 (2013.01)

(58) Field of Classification Search
CPC ...... B01J 2219/00621; B01J 2219/0063; B01J 2219/00637; B01J 2219/00646; B01J 2219/00659
See application file for complete search history.

(56) References Cited

OTHER PUBLICATIONS

Billiet, T., et al. (2012) "A Review of Trends and Limitations in Hydrogel-Rapid Prototyping for Tissue Engineering," Biomaterials 33: 6020-6041.

Bruchet, M., et al. (2015) "Fabrication of Patterned Calcium Cross-Linked Alginate Hydrogel Films and Coatings Through Reductive Cation Exchange," Carbohydr. Polym. 131: 57-64.

Cheng, Y., et al. (2011) "Mechanism of Anodic Electrodeposition of Calcium Alginate," Soft Matter 7: 5677-5684.

Cheong, M., et al. (2008) "Electrodeposition of Alginic Acid and Composite Films," Colloids Surf., A 328: 73-78.

Cui, J. X., et al. (2013) "Light-Triggered Cross-Linking of Alginates with Caged Ca2+," Biomacromolecules 14: 1251-1256.

Fernandes, R., et al. (2004) "Thermo-Biolithography: A Technique for Patterning Nucleic Acids and Proteins," Langmuir 20: 906-913.

He, Y., et al. (2016) "Research on the Printability of Hydrogels in 3D Bioprinting," Sci. Rep. 6: 29977.

Hoffman, A.S. (2002) "Hydrogels for Biomedical Applications," Adv. Drug Deliv. Rev. 54: 3-12.

Javvaji, V., et al. (2011) "Light-Activated Ionic Gelation of Common Biopolymers," Langmuir 27: 12591-12596.

Jeon, O., et al. (2009) "Photocrosslinked Alginate Hydrogels with Tunable Biodegradation Rates and Mechanical Properties," Biomaterials 30: 2724-2734.

Jin, Z.Y., et al., (2012) "Electrochemically Controlled Drug-Mimicking Protein Release from Iron-Alginate Thin-Films Associated with an Electrode," ACS Appl. Mater. Interfaces 4: 466-475.

Laftah, W.A., et al. (2011) "Polymer Hydrogels: A Review," Polym.-Plast. Technol. Eng. 50: 1475-1486.

Larson, R.G. (1999) The Structure and Rheology of Complex Fluids; Oxford University Press: New York ; Oxford.

Lee, K.Y., et al. (2001) "Hydrogels for Tissue Engineering," Chem. Rev. 101: 1869-1880.

Lee, K.Y., et al. (2012) "Alginate: Properties and Biomedical Applications," Prog. Polym. Sci. 37: 106-126.

Luo, X.L., et al. (2012) "Biofabrication of Stratified Biofilm Mimics for Observation and Control of Bacterial Signaling," Biomaterials 33: 5136-5143.

Macosko, C.W. (1994) Rheology: Principles, Measurements, and Applications; Wiley-VCH: New York.

Maerten, C., et al. (2017) "Review of Electrochemically Triggered Macromolecular Film Buildup Processes and Their Biomedical Applications," ACS Appl. Mater. Interfaces 9: 28117-28138.

Mohammed, Z.H., et al. (1998) "Kinetic and Equilibrium Processes in the Formation and Melting of Agarose Gels," Carbohydr. Polym. 36: 15-26.

Oh, H., et al. (2016) "Light-Directed Self-Assembly of Robust Alginate Gels at Precise Locations in Microfluidic Channels," ACS Appl. Mater. Interfaces 8: 17529-17538.

Osada, Y., et al. (2004) "Polymer Gels," J. Macromol. Sci., Polym. Rev. C44: 87-112.

Palleau, E., et al. (2013) "Reversible Patterning and Actuation of Hydrogels by Electrically Assisted Ionoprinting," Nat. Commun. 4: 2257.

Ross-Murphy, S.B., et al. (1993) "Polysaccharide Strong and Weak Gels," Biorheology 30: 217-227.

Seely, G.R., et al. (1974) "Binding of Alkaline-Earth Metal-Ions to Alginate," Macromolecules 7: 706-710.

Shi, X.W., et al. (2009) "Electroaddressing of Cell Populations by Co-Deposition with Calcium Alginate Hydrogels," Adv. Funct. Mater. 19: 2074-2080.

Skardal, A., et al. (2015) "Biomaterials for Integration with 3-D Bioprinting," Ann. Biomed. Eng. 43: 730-746.

Song, S.J., et al. (2011) "Sodium Alginate Hydrogel-Based Bioprinting Using a Novel Multinozzle Bioprinting System," Artif. Organs 35: 1132-1136.

Tabriz, A.G., et al. (2015) "Three-Dimensional Bioprinting of Complex Cell Laden Alginate Hydrogel Structures," Biofabrication 7: 045012.

Tanaka, T. (1981) "Gels," Sci. Am. 244: 124-138.

Wang, Z.Y., et al. (1994) "Sol-Gel Transition of Alginate Solution by the Addition of Various Divalent-Cations—A Rheological Study," Biopolymers 34: 737-746.

Winkleman, A., et al. (2007) "Fabrication and Manipulation of Ionotropic Hydrogels Cross- Linked by Paramagnetic Ions," Chem. Mater. 19: 1362-1368.

Wu, L.Q., et al. (2002) "Voltage-Dependent Assembly of the Polysaccharide Chitosan Onto an Electrode Surface," Langmuir 18: 8620-8625.

Yan, K., et al. (2016) "Electro-Molecular Assembly: Electrical Writing of Information into an Erasable Polysaccharide Medium," ACS Appl. Mater. Interfaces 8: 19780-19786.

Yan, K., et al. (2018) "Electrical Programming of Soft Matter: Using Temporally Varying Electrical Inputs to Spatially Control Self Assembly," Biomacromolecules 19: 364-373.

Yokoyama, F., et al. (1998) "Formation of Optically Anisotropic Alginic Acid Gels Under DC Electric Fields," Eur. Polym. J. 34: 229-234.

Yu, J.J., et al. (2012) "In vitro 3D Human Small Intestinal Villous Model for Drug Permeability Determination," Biotechnol. Bioeng. 109: 2173-2178.

Yung, C.W., et al. (2007) "Transglutaminase Crosslinked Gelatin as a Tissue Engineering Scaffold," J. Biomed. Mater. Res. Part A 83A: 1039-1046.

\* cited by examiner

SYSTEMS AND METHODS OF FORMING HYDROGEL STRUCTURES AND STRUCTURES FORMED THEREFROM

CROSS-REFERENCE TO RELATED APPLICATION

This application is based on U.S. Provisional Patent Application Ser. No. 63/012,695, entitled "System and Method for Forming and Shaping Biopolymer Gels Using Electric Fields," filed Apr. 20, 2020, which application is incorporated herein by reference in its entirety and to which priority is claimed.

FIELD OF THE INVENTION

The present disclosure relates to systems and methods for forming hydrogel structures via application of an electric potential, and three-dimensional and multilayered hydrogel structures formed therefrom.

BACKGROUND OF THE INVENTION

Polymer hydrogels are a quintessential class of soft materials (Tanaka, T. "Gels." Sci. Am. 1981, 244, 124-138; Osada, Y. et al. "Polymer Gels." J. Macromol. Sci., Polym. Rev. 2004, C44, 87-112; Laftah, W. A. et al. "Polymer Hydrogels: A Review." Polym.-Plast. Technol.Eng. 2011, 50, 1475-1486). A hydrogel is a sample-spanning, three-dimensional (3-D) network of polymer chains, with the aqueous solvent trapped in the network. Hydrogels can be broadly classified into two categories: chemical and physical gels. Chemical gels are formed by the polymerization of a solution containing monomers and crosslinkers, with the resulting polymer chains being connected by covalent crosslinks. Physical gels are formed by inducing physical crosslinks between long polymer chains.

An example of a physical gel is that of alginate (denoted as Alg herein) (Lee, K. Y. and Mooney, D. J. "Alginate: Properties and Biomedical Applications." Prog. Polym. Sci. 2012, 37, 106-126; Seely, G. R. and Hart, R. L. "Binding of Alkaline-Earth Metal-Ions to Alginate." Macromolecules 1974, 7, 706-710; Wang, Z. Y. et al. "Sol-Gel Transition of Alginate Solution by the Addition of Various Divalent-Cations—A Rheological Study." Biopolymers 1994, 34, 737-746; Winkleman, A. et al. "Fabrication and Manipulation of Ionotropic Hydrogels Cross-Linked by Paramagnetic Ions." Chem. Mater. 2007, 19, 1362-1368; Agulhon, P. et al. "Structural Regime Identification in Ionotropic Alginate Gels: Influence of the Cation Nature and Alginate Structure." Biomacromolecules 2012, 13, 215-220). In this case, a solution of sodium alginate, an anionic polysaccharide, is combined with a salt of a divalent cation like calcium ($Ca^{2+}$). The $Ca^{2+}$ cations crosslink the alginate chains through ionic bonds, thereby leading to a physical gel of alginate. Alg gels are extensively used in biomedical applications due to their nontoxic, biocompatible nature and due to the mildness of the gelation process. In particular, Alg gels are used to encapsulate a range of biological cells. For this, the cells of interest are mixed initially with the Alg solution, and this mixture is then combined with the crosslinking solution (containing $Ca^{2+}$ ions) to form a gel with embedded cells (Hoffman, A. S. "Hydrogels for Biomedical Applications." Adv. Drug Deliv. Rev. 2002, 54, 3-12; Lee, K. Y. and Mooney, D. J. "Hydrogels for Tissue Engineering." Chem. Rev. 2001, 101, 1869-1880).

Researchers have sought other ways to manufacture gels, both physical and chemical. One motivation for this research has been the advent of methods like additive manufacturing (3-D printing), which promise to enable synthesis of some materials with precise shapes and properties. While 3-D printing is routinely implemented with thermoplastic polymers, its extension to biomedically relevant soft structures has not been successful, particularly with regard to Alg gels (Billiet, T. et al. "A Review of Trends and Limitations in Hydrogel-Rapid Prototyping for Tissue Engineering." Biomaterials 2012, 33, 6020-6041; Skardal, A. and Atala, A. "Biomaterials for Integration with 3-D Bioprinting." Ann. Biomed. Eng. 2015, 43, 730-746; He, Y. et al. "Research on the Printability of Hydrogels in 3D Bioprinting." Sci. Rep. 2016, 6, 29977).

To manufacture a tissue-like material, it would be useful to create multilayered gels, with each layer having a precise thickness and containing a specific type of cells. Also, such materials would need to be created in accurate shapes and patterns. For such precision-manufacturing, the current Alg gelation processes of combining an initial Alg solution with a solution of a crosslinker is not well-suited, and indeed current attempts at 3-D printing Alg gels are cumbersome (He, Y. et al. "Research on the Printability of Hydrogels in 3D Bioprinting." Sci. Rep. 2016, 6, 29977; Song, S. J. et al. "Sodium Alginate Hydrogel-Based Bioprinting Using a Novel Multinozzle Bioprinting System." Artif. Organs 2011, 35, 1132-1136; Tabriz, A. G. et al. "Three-Dimensional Bioprinting of Complex Cell Laden Alginate Hydrogel Structures." Biofabrication 2015, 7, 045012). There is thus a need for alternate techniques that allow an polymer gel, e.g., Alg gel, to be formed upon the flick of a switch (i.e., so that there is a precise "start") and conversely for this formation to cease when the switch is turned off (i.e., to ensure a precise "stop").

Attempts have been made to achieve such start-stop gelation, e.g., such as by using external stimuli such as light (Jeon, O. et al. "Photocrosslinked Alginate Hydrogels with Tunable Biodegradation Rates and Mechanical Properties." Biomaterials 2009, 30, 2724-2734; Javvaji, V. et al. "Light-Activated Ionic Gelation of Common Biopolymers." Langmuir 2011, 27, 12591-12596; Cui, J. X. et al. "Light-Triggered Cross-Linking of Alginates with Caged Ca2+." Biomacromolecules 2013, 14, 1251-1256; Bruchet, M. and Melman, A. "Fabrication of Patterned Calcium Cross-Linked Alginate Hydrogel Films and Coatings Through Reductive Cation Exchange." Carbohydr. Polym. 2015, 131, 57-64; Oh, H. et al. "Light-Directed Self-Assembly of Robust Alginate Gels at Precise Locations in Microfluidic Channels." ACS Appl. Mater. Interfaces 2016, 8, 17529-17538; Palleau, E. et al. "Reversible Patterning and Actuation of Hydrogels by Electrically Assisted Ionoprinting." Nat. Commun. 2013, 4, 2257; Yan, K. et al. "Electro-Molecular Assembly: Electrical Writing of Information into an Erasable Polysaccharide Medium." ACS Appl. Mater. Interfaces 2016, 8, 19780-19786; Yan, K. et al. "Electrical Programming of Soft Matter: Using Temporally Varying Electrical Inputs To Spatially Control Self Assembly." Biomacromolecules 2018, 19, 364-373). Light-induced physical gelation of Alg has been shown, for example, using chemicals that release $Ca^{2+}$ upon shining ultraviolet (UV) light (Javvaji, V. et al. "Light-Activated Ionic Gelation of Common Biopolymers." Langmuir 2011, 27, 12591-12596; Cui, J. X. et al. "Light-Triggered Cross-Linking of Alginates with Caged Ca2+." Biomacromolecules 2013, 14, 1251-1256; Oh, H. et al. "Light-Directed Self-Assembly of Robust Alginate Gels at Precise Locations in Microfluidic Channels." ACS Appl.

Mater. Interfaces 2016, 8, 17529-17538). However, these techniques are relatively slow and primarily suited to forming Alg gels as thin films rather than as 3-D materials.

The use of electric fields has also been attempted for start-stop gelation. Electrodeposition of thin films on electrodes has been shown (see, e.g., Maerten, C. et al. "*Review of Electrochemically Triggered Macromolecular Film Buildup Processes and Their Biomedical Applications.*" ACS Appl. Mater. Interfaces 2017, 9, 28117-28138). However, the formation of gels in bulk or in specific geometries via conventional electrodeposition techniques has not been achieved. In regard to electrodeposition, systematic studies have been done by Payne et al., first with the cationic biopolymer chitosan (Wu, L. Q. et al. "*Voltage-Dependent Assembly of the Polysaccharide Chitosan Onto an Electrode Surface.*" Langmuir 2002, 18, 8620-8625), and thereafter also with Alg (Shi, X. W. et al. "*Electroaddressing of Cell Populations by Co-Deposition with Calcium Alginate Hydrogels.*" Adv. Funct. Mater. 2009, 19, 2074-2080; Cheng, Y. et al. "*Mechanism of Anodic Electrodeposition of Calcium Alginate.*" Soft Matter 2011, 7, 5677-5684). In the case of chitosan, the authors exploited the fact that, when direct current (DC) is passed through water, electrolysis leads to pH gradients close to the electrodes. Near the cathode, the pH becomes high whereas near the anode the pH becomes low. Accordingly, chitosan, which has a pKa around 6.5, deposits on the surface of the cathode because the polymer chains lose their charge due to the high pH and thus fall out of solution (Wu, L. Q. et al. "*Voltage-Dependent Assembly of the Polysaccharide Chitosan Onto an Electrode Surface.*" Langmuir 2002, 18, 8620-8625).

Electrodeposition has also been attempted with Alg at the anode (Yokoyama, F. et al. "*Formation of Optically Anisotropic Alginic Acid Gels Under DC Electric Fields.*" Eur. Polym. J. 1998, 34, 229-234; Cheong, M. and Zhitomirsky, I. "*Electrodeposition of Alginic Acid and Composite Films.*" Colloids Surf., A 2008, 328, 73-78). An alternative approach in the case of Alg is to use the pH drop (release of $H^+$) at the anode to solubilize calcium carbonate ($CaCO_3$) particles suspended in the solution, resulting in the evolution of free $Ca^{2+}$ (Shi, X. W. et al. "*Electroaddressing of Cell Populations by Co-Deposition with Calcium Alginate Hydrogels.*" Adv. Funct. Mater. 2009, 19, 2074-2080; Cheng, Y. et al. "*Mechanism of Anodic Electrodeposition of Calcium Alginate.*" Soft Matter 2011, 7, 5677-5684). These cations gel the Alg, which deposits on the anode. Other electrodeposition schemes have been reported using cations like Fe(II) (Jin, Z. Y. et al. "*Electrochemically Controlled Drug-Mimicking Protein Release from Iron-Alginate Thin-Films Associated with an Electrode.*" ACS Appl. Mater. Interfaces 2012, 4, 466-475; see also Maerten, C. et al. "*Review of Electrochemically Triggered Macromolecular Film Buildup Processes and Their Biomedical Applications.*" ACS Appl. Mater. Interfaces 2017, 9, 28117-28138).

Unfortunately, regardless of the approached attempted, Alg electrodeposition has been restricted to thin films on very specific substrates (electrodes). Moreover, in prior attempts, when the field is switched off, gelation does not sufficiently stop. For example, if gelation is due to a pH gradient in solution, this gradient will continue to exist for some time after the field is switched off.

Accordingly, there is a need for improved techniques that overcome some or all of the deficiencies noted above, and/or for forming hydrogels in bulk and/or in specific configurations.

SUMMARY OF THE DISCLOSURE

The present disclosure relates to systems and methods for forming and shaping polymer hydrogels. The disclosed systems and methods may be utilized to produce and shape gels in many forms, for example, cylinders, hollow tubes, plates, etc., including structures with multiple concentric layers. In such an embodiment, each layer may be utilized to carry a payload, which may be the same or different in the various layers. Thus, the structures may carry various payloads. For example, the present system and method may be utilized to encapsulate biological species and/or therapeutic agents within the layers. Certain embodiments of the present system also provide for the formation of specific patterns by directing gel growth around selected regions of a mold substrate. Certain embodiments of the presently described system and method provide for the manufacture of biopolymer gels in 3-D without the need for an expensive 3-D printer.

The present disclosure relates to a method of forming a biopolymer hydrogel structure, comprising the steps of: providing a mold loaded with a cation; exposing a surface portion of said mold to a solution comprising a gellable polymer; and applying an electric potential to said mold so that said cation and said gellable polymer migrate via electrophoresis toward said surface portion, thereby interacting and forming a hydrogel structure adjacent to said surface portion. In some implementations, the surface portion is a first surface portion, wherein the mold further comprises a second surface portion comprising a hydrophobic coating thereon. In some implementations, the applied electric potential is a voltage of between about 1 volt and about 30 volts, preferably between about 1 volt and about 20 volts, more preferably between about 5 volts and about 15 volts.

In some embodiments, the method comprises the further steps of: providing a reservoir coupled to a cathode; and disposing said mold within said reservoir and spaced from said cathode, wherein said mold is coupled to an anode, and wherein said electric potential is applied to said anode so that said cation migrate from said mold toward said cathode.

In some embodiments, the method comprises the further step of separating said formed hydrogel structure from said mold. In some implementations, the separating step comprises liquifying, degrading, cutting or mechanically removing the mold from the formed hydrogel structure. In some implementations, the method comprises the further step of incubating said formed and separated hydrogel structure in a cation solution.

In some implementations, the gellable polymer comprises a biopolymer, e.g., including but not limited to alginate, collagen, gelatin, dextran, chitosan, cellulose, or starch. In some implementations, the gellable polymer comprises a synthetic polymer, e.g., including but not limited to polyacrylic acid, vinyl acetate, acrylamide, ethylene glycol or lactic acid. In some implementations, the solution comprises between about 1 wt % and about 10 wt % of the gellable polymer.

In some implementations, the mold comprises a thermoresponsive polymer. In some implementations, the mold comprises agarose, gelatin, cellulose, hyaluronan, chitosan, and/or acrylamide. In some implementations, the mold has a first melting point, and the formed hydrogel structure has a second melting point greater than the first melting point. In some implementations, the cation is $Ca^{2+}$. In other implementations, the cation is $Sr^{2+}$, $Cu^{3+}$, $Fe^{3+}$ or $Ho^{3+}$. In some implementations, the mold is formed from a solution comprising between about 0.01 wt % and about 10 wt % of cation.

In some embodiments, the method provides for a solution comprising the gellable polymer, and additionally comprising a therapeutic agent, a diagnostic agent, and/or a labeling agent. The therapeutic agent, diagnostic agent, and/or labeling agent may be encapsulated by, disposed within or coupled to the formed hydrogel structure. In some embodiments, the solution comprising the gellable polymer further comprises another secondary agent, e.g., including but not limited to a nanoparticle, a label or dye, an enzyme, a protein, a peptide, a nucleic acid, a virus, and/or cell such as a bacteria.

The present disclosure also relates to a system for forming a polymer hydrogel structure. In some implementations, the system includes a reservoir coupled to a cathode. An anode is disposed within the reservoir and spaced from the cathode. A mold is disposed within the reservoir and coupled to the anode. The mold is loaded with a cation. A solution comprising a gellable polymer is disposed within the reservoir, so that the solution is in contact with a surface portion of the mold. A power supply is provided, which is configured to apply an electric potential to the anode so that cation and the gellable polymer migrate via electrophoresis toward the surface portion of the mold, thereby interacting and forming a hydrogel structure adjacent to the surface portion.

In some implementations, the gellable polymer comprises a biopolymer e.g., including but not limited to alginate, collagen, gelatin, dextran, chitosan, cellulose, or starch. In some implementations, the gellable polymer comprises a synthetic polymer, e.g., including but not limited to polyacrylic acid, vinyl acetate, acrylamide, ethylene glycol or lactic acid.

In some implementations, the mold of the system comprises a thermo-responsive polymer. In some implementations, the mold comprises agarose, gelatin, cellulose, hyaluronan, chitosan, and/or acrylamide. In some implementations, the mold has a first melting point, and the formed hydrogel structure has a second melting point greater than the first melting point. In some implementations, the cation is $Ca^{2+}$. In other implementations, the cation is $Sr^{3+}$, $Cu^{3+}$, $Fe^{3+}$ or $Ho^{3+}$. In some implementations, the mold is formed from a solution comprising between about 0.01 wt % and about 10 wt % of cation. In some implementations, the mold is formed from a solution comprising between about 0.01 wt % and about 10 wt % of cation.

In some embodiments, the system provides for a solution comprising the gellable polymer, and additionally comprising a therapeutic agent, a diagnostic agent, a labeling agent, and/or other secondary agent, as described above.

BRIEF DESCRIPTION OF THE DRAWINGS

FIG. 5. Comparing the rheology of Alg gels formed in the presence and absence of an electric field. The elastic modulus G' of the gels is plotted as a function of $Ca^{2+}$ in the agarose mold. During electroformation, the gel arises due to electrically induced migration of $Ca^{2+}$, as shown by the top schematic. When the field is switched off and the $Ca^{2+}$ is high, a gel can still form by simple diffusion of $Ca^{2+}$ out of the mold, as shown by the bottom schematic. When the $Ca^{2+}$ is low (0.01 or 0.1 wt %), the Alg gel forms only when the field is switched on.

DETAILED DESCRIPTION OF EMBODIMENTS

The present disclosure is directed to novel systems and methods for forming and shaping hydrogel structures or layers, e.g., an Alg hydrogel structure, upon applying an electric field. As well known in the art, hydrogels, or gels, comprise cross-linked polymer networks that may be extensively swollen with water. Hydrogel-forming biopolymers include proteins such as collagen and gelatin, and other polysaccharides such as dextran, chitosan, cellulose, alginate, starch, and agarose (see, e.g., Ahmed, E. M. *Hydrogel: Preparation, characterization and applications: A review*, J. Advanced Res., 6, 105-121 (2015). Hydrogel-forming synthetic polymers include polyacrylic acid, vinyl acetate, acrylamide, ethylene glycol and lactic acid.

The disclosed techniques are rapid and biocompatible, and provide for electrophoretic migration rather than electrolysis of water. Importantly, the technique allows transparent and robust hydrogels to be formed in desired shapes and patterns. Single or multilayer hydrogel structures may be constructed to have various geometric configurations, including, e.g., cylindrical, rectangular, tubular, etc. In addition, the hydrogel layers or structures may be constructed in a wide range of sizes. The geometrical flexibility of the disclosed techniques is due in part to the use of a molded polymer, e.g., agarose gel, as an electrode. The mold also serves as the substrate for the hydrogel growth.

Agarose is a nonionic, thermo-responsive polysaccharide; cooling an agarose solution converts it into a gel (Ross-Murphy, S. B. and Shatwell, K. P. "*Polysaccharide Strong and Weak Gels.*" Biorheology 1993, 30, 217-227; Mohammed, Z. H. et al. "*Kinetic and Equilibrium Processes in the Formation and Melting of Agarose Gels.*" Carbohydr. Polym. 1998, 36, 15-26). In some implementations, an agarose mold (containing $Ca^{2+}$) is placed in an Alg solution and an electrical basis with a specific polarity is applied thereto. An Alg gel may be formed around the mold within minutes. Gelation occurs because $Ca^{2+}$ ions and Alg chains migrate towards each other and come into contact at the surface of the agarose mold. The shape of the Alg gel thus becomes an inverse replica of the mold. The use of the electric field allows gelation to be started and stopped on demand; in turn, this enables the controlled synthesis of gels in 3-D architectures. Specifically, we show the synthesis of tubular structures (e.g., Alg tubes) having multiple layers and with nanoparticles or biological cells and/or other agents embedded in specific layers thereof. The simplicity and versatility of the disclosed methods allows for custom-fabrication of hydrogels, and provides an attractive alternative to 3-D printing.

DISCUSSION AND RESULTS

Electrogelation Setup and Procedure

Figure 1:
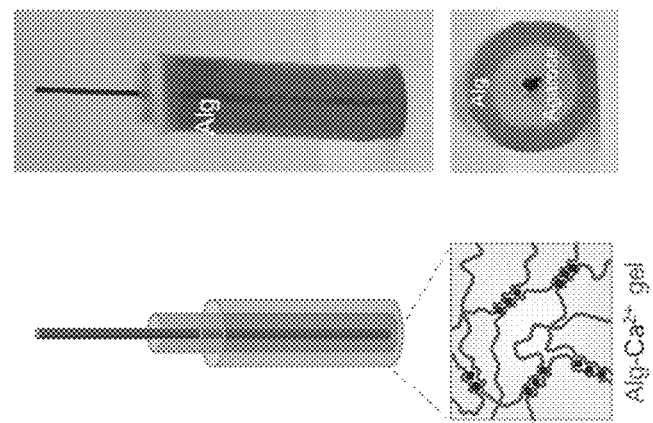
FIG. 1. Procedure for electrogelation of alginate (Alg). The photo in (a) and the schematic in (b) show the setup. The key components are an agarose gel containing $Ca^{2+}$ with a graphite wire in it, and a beaker covered on its inside with aluminum (Al) foil and filled with a solution of Alg. The Al acts as the cathode and the graphite as the anode. When a DC field is turned on, $Ca^{2+}$ ions migrate out of the mold and encounter Alg chains at the mold surface. Crosslinking of Alg chains by $Ca^{2+}$ leads to an Alg gel around the mold, as shown in (c). The photos show the agarose core surrounded by a shell of the Alg gel, which had a pink-red color due to the inclusion of a dye in the Alg solution.
Figure 2:
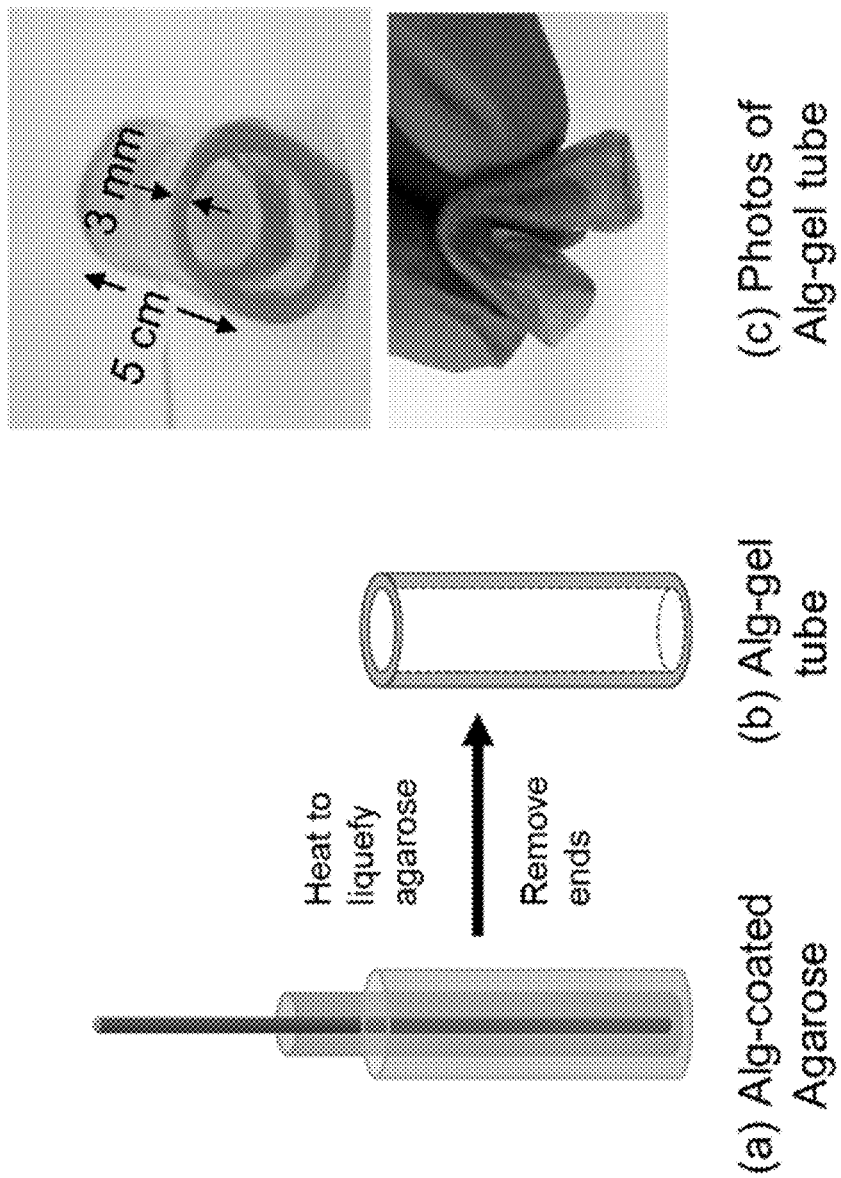
FIG. 2. Preparation of a tubular Alg gel. The Alg-coated agarose in (a) (see FIG. 1) is heated to 80° C. to liquefy the agarose. This leaves behind a hollow tube of Alg, as shown schematically in (b). The photos in (c) reveal that the Alg tube is strong and flexible.

Agarose dissolves in water at temperatures around 80° C. When the agarose solution is cooled to room temperature, it transforms into a gel (Mohammed, Z. H. et al. "*Kinetic and Equilibrium Processes in the Formation and Melting of Agarose Gels.*" Carbohydr. Polym. 1998, 36, 15-26). The solution to gel transition is reversible, i.e., the gel can be liquefied by heating. We first made a cylindrical agarose gel containing $Ca^{2+}$. For this, 2.5 wt % of agarose and 0.1 wt % of $CaCl_2$ were added to deionized (DI) water and dissolved by heating to 80° C. (see FIG. 2). The hot solution was poured into a glass test-tube around a graphite electrode and allowed to cool to room temperature, whereupon the agarose sets into a molded gel. This mold (5.5 cm long, 1 cm diameter) was then used in the electrogelation setup, as shown in FIGS. 1a and 1b. In the setup, the graphite is connected to a DC power supply and it serves as the anode (positive electrode). The mold is placed in a beaker that is wrapped on its inside with aluminum (Al) foil, which serves as the cathode (negative electrode). Alg (sodium salt) at a concentration of 1 wt % is poured in the beaker and here it was dyed pink-red (using 0.5 mM of acid red 52 dye) for visualization.

We then apply an electric potential (~10 V), whereupon the $Ca^{2+}$ ions in the mold begin migrating towards the cathode, i.e., away from the mold (see schematic in FIG. 1b). Correspondingly, Alg chains in the solution also migrate towards the mold (anode). This electrophoresis causes the $Ca^{3+}$ to contact the Alg at the surface of the mold, resulting in an Alg gel layer. In the experiment, the Alg gel shown in FIG. 1c had a pink-red coloration around the agarose mold. A schematic of the Alg gel is provided in FIG. 1c. Note that the divalent $Ca^{2+}$ cations form "egg-box" junctions between the anionic Alg chains, thereby crosslinking the chains into a network (Lee, K. Y. and Mooney, D. J. "*Alginate: Properties and Biomedical Applications.*" Prog. Polym. Sci. 2012, 37, 106-126; Seely, G. R. and Hart, R. L. "*Binding of Alkaline-Earth Metal Ions to Alginate.*" Macromolecules 1974, 7, 706-710; Wang, Z. Y. et al. "*Sol-Gel Transition of Alginate Solution by the Addition of Various Divalent-Cations—A Rheological Study.*" Biopolymers 1994, 34, 737-746; Winkleman, A. et al. "*Fabrication and Manipulation of Ionotropic Hydrogels Cross-Linked by Paramagnetic Ions.*" Chem. Mater. 2007, 19, 1362-1368; Agulhon, P. et al. "*Structural Regime Identification in Ionotropic Alginate Gels: Influence of the Cation Nature and Alginate Structure.*" Biomacromolecules 2012, 13, 215-220).

The gel layer around the mold grows over time, but when the electric field is switched off, the growth stops. The Alg gel layer in FIG. 1c is formed over 5 min of applying the field. From the cross-section view, we infer that the layer is 3 mm thick at this point. Next, as shown in FIGS. 2a and 2b, we place the above agarose-Alg assembly in a hot-water bath at 80° C., which causes the central agarose mold to be dissolved away, leaving behind a hollow tubular gel of Alg (with the tube wall being 3 mm thick). FIG. 2c shows two different photos of the resulting tubular gel. The tube is flexible and bendable, yet strong and robust. If desired, the tube can be subsequently incubated in a $Ca^{2+}$ solution to increase its mechanical strength. For example, an electroformed tube can be placed in a 5 wt % $Ca^{2+}$ solution for 10-30 min and thereby made more robust.

The exemplary technique described above may be modified in various ways. First, it is not limited to $Ca^{2+}$ ions. Any multivalent cation that can crosslink Alg (such as $Sr^{2+}$, $Cu^{2+}$, $Fe^{3+}$ and $Ho^{3+}$) may be incorporated into the mold and used to electroform the Alg gel (Seely, G. R. and Hart, R. L. "*Binding of Alkaline-Earth Metal-Ions to Alginate.*" *Macromolecules* 1974, 7, 706-710; Winkleman, A. et al. "*Fabrication and Manipulation of Ionotropic Hydrogels Cross-Linked by Paramagnetic Ions.*" Chem. Mater. 2007, 19, 1362-1368). Instead of Alg, other biopolymers that can be gelled by such cations may be used, e.g., such as collagen, gelatin, dextran, chitosan, cellulose, starch or pectin (Javvaji, V. et al. "*Light-Activated Ionic Gelation of Common Biopolymers.*" Langmuir 2011, 27, 12591-12596) or synthetic polymers such as vinyl acetate, acrylamide, ethylene glycol, lactic acid, or polyacrylic acid (Palleau, E. et al. "*Reversible Patterning and Actuation of Hydrogels by Electrically Assisted Ionoprinting.*" Nat. Commun. 2013, 4, 2257).

In addition, the present techniques are not limited to the use of agarose as the mold. For example, if the mold does not have be to be removed, any gel, including chemically crosslinked hydrogels, e.g., acrylamides could be used as the $Ca^{2+}$-containing mold (Osada, Y. et al. "*Polymer Gels.*" J. Macromol. Sci., Polym. Rev. 2004, C44, 87-112; Laftah, W. A. et al. "*Polymer Hydrogels: A Review.*" Polym.-Plast. Technol.Eng. 2011, 50, 1475-1486). If the mold needs to be removed at a more moderate temperature, we can replace agarose with gelatin (Hoffman, A. S. "*Hydrogels for Biomedical Applications .*" Adv. Drug Deliv. Rev. 2002, 54, 3-12; Lee, K. Y. and Mooney, D. J. "*Hydrogels for Tissue Engineering.*" Chem. Rev. 2001, 101, 1869-1880), since gelatin gels can be melted around 40° C.

Also, the mold could be degraded at room temperature using enzymes; for instance, a mold made of gelatin could be degraded by enzymes from the collagenase or proteinase families (Fernandes, R. et al. "*Thermo-Biolithography: A Technique for Patterning Nucleic Acids and Proteins.*" Langmuir 2004, 20, 906-913; Yung, C. W. et al. "*Transglutaminase Crosslinked Gelatin as a Tissue Engineering Scaffold.*" J. Biomed. Mater. Res. Part A 2007, 83A, 1039-1046). Additionally, molds of any shape and geometry can be used. Exemplary disc-like molds and flat-sheet molds are shown herein, and in all cases the hydrogel (e.g., Alg gel) forms around the mold when the electric field is applied.

Kinetics of Gel Growth

Figure 3:
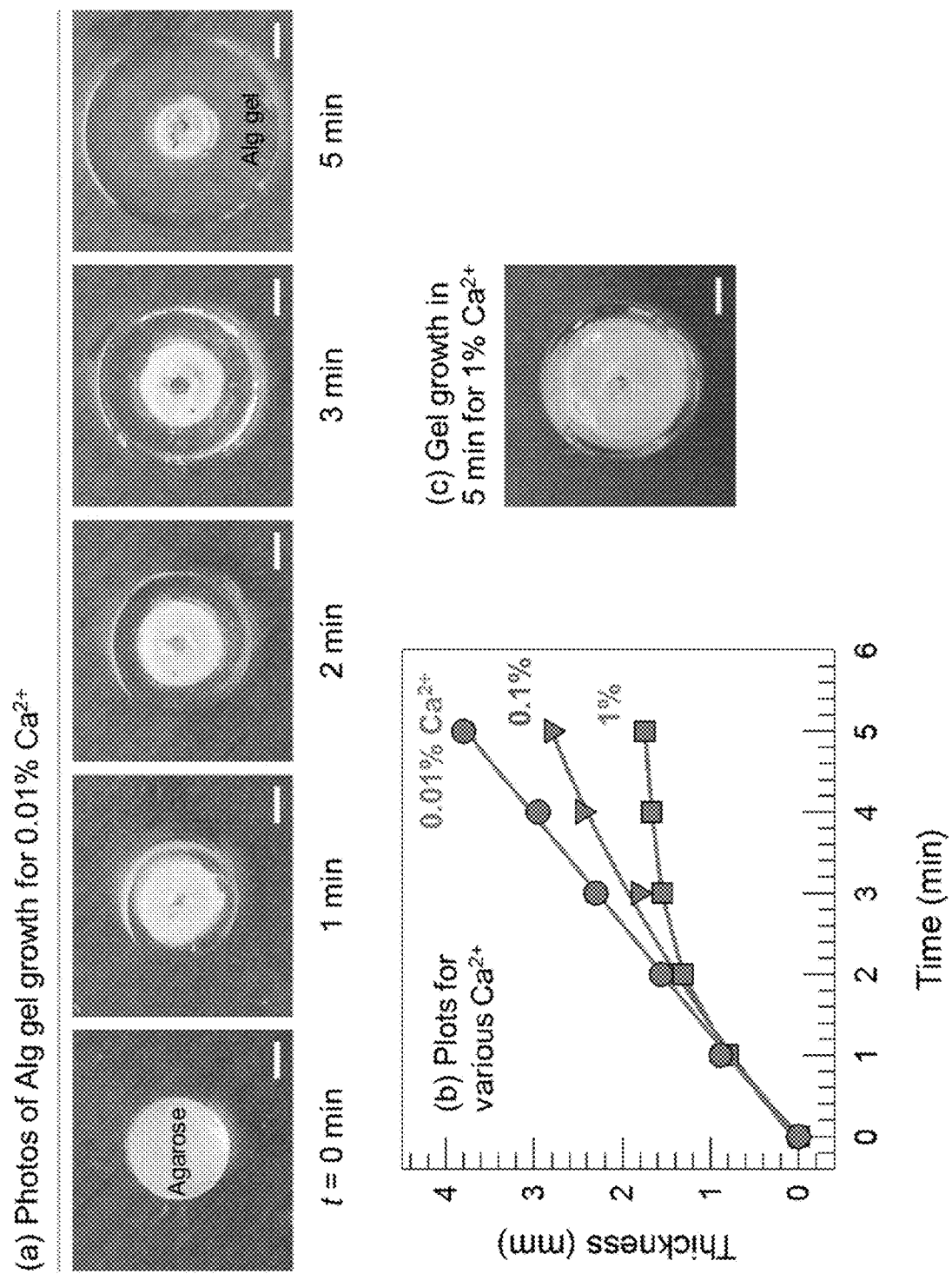
FIG. 3. Growth kinetics of electroformed Alg gel. A 2.5% agarose disk with $Ca^{2+}$ is placed in a solution of 1 wt % Alg. At t=0, a potential of 10 V is applied. (a) Photos showing the growth of an Alg gel layer around the disk for a $Ca^{2+}$ concentration of 0.01 wt %. (b) Thickness of the Alg gel layer as a function of time for three $Ca^{2+}$ concentrations. (c) Photo of the Alg gel around the disk for a $Ca^{3+}$ of 1 wt % after 5 min of applying the potential. The scale bars in all images are 2 mm.

We studied the growth of the Alg gel with time around an agarose mold for different $Ca^{2+}$ concentrations in the mold. For this, the agarose mold was made in the shape of a disc (5.5 mm in diameter, 4 mm in height) and placed in a Petri dish containing 1% Alg solution while being observed (see Experimental Section for details). FIG. 3a shows images of the growing Alg gel over 5 min at a potential of 10 V. These images are for the case of 0.01 wt % $Ca^{2+}$ in the agarose mold. The Alg gel can be easily resolved because it is transparent while the agarose mold is cloudy. The thickness of the Alg gel steadily increases over time (FIG. 3b), with the increase being close to linear at ~0.8 mm/min for this low $Ca^{2+}$ concentration. As the $Ca^{2+}$ concentration is increased, a different shape of the plot is seen in FIG. 3b: after an initial linear increase, the gel thickness saturates within the 5 min period. Also, FIG. 3c shows that, after 5 min, the Alg gel for the case of 1 wt % $Ca^{2+}$ is approximately 1.5 mm thick; for comparison, this layer is about 4 mm thick at the same point of time in FIG. 3a when the $Ca^{2+}$ is at 0.01 wt %.

The above result might seem counterintuitive; one might expect the thickness to increase with higher availability of $Ca^{2+}$ ions, but the opposite was observed in our experiments. In this regard, it is believed that there is a difference in the nature of Alg gel formation at low and high $Ca^{2+}$. At high $Ca^{3+}$, we expect the ions to crosslink the Alg into a dense network (Lee, K. Y. and Mooney, D. J. "*Alginate: Properties and Biomedical Applications.*" Prog. Polym. Sci. 2012, 37, 106-126; Seely, G. R. and Hart, R. L. "*Binding of Alkaline-Earth Metal-Ions to Alginate.*" Macromolecules 1974, 7, 706-710; Wang, Z. Y. et al. "*Sol-Gel Transition of Alginate Solution by the Addition of Various Divalent-Cations—A Rheological Study.*" Biopolymers 1994, 34, 737-746; Winkleman, A. et al. "*Fabrication and Manipulation of Ionotropic Hydrogels Cross-Linked by Paramagnetic Ions.*" Chem. Mater. 2007, 19, 1362-1368; Agulhon, P. et al. "*Structural Regime Identification in Ionotropic Alginate Gels: Influence of the Cation Nature and Alginate Structure.*" Biomacromolecules 2012, 13, 215-220). This dense network is believed to hinder further migration of $Ca^{2+}$ ions from the interior of the mold, and thereby restrict the thickness of the gel. In contrast, the network at lower $Ca^{2+}$ will be less dense, which is believed to allow $Ca^{2+}$ ions to migrate through, and thereby give rise to thicker gels.

The results herein indicate that there are advantages to using relatively low $Ca^{3+}$ (0.01 to 0.1 wt %) in the mold: in particular, the lower $Ca^{2+}$ concentration allows the gels to grow to larger dimensions. A second advantage at these lower $Ca^{3+}$ concentrations is that there is no detectable growth of the gel in the absence of the electrical signal. Thus, we have a true "on-off" switch for gel growth. In contrast, when the $Ca^{2+}$ is 1 wt % or higher, a thin gel layer forms slowly around the mold even in the absence of the electric field simply by diffusion. Measuring the rate of gel growth by diffusion at 1 wt % $Ca^{2+}$ (see FIG. 3), the growth rate was found to be 17 μm/min, which is about 50 times slower than the rate of gel growth by the electric field. A rheological comparison of gels formed by the field and by diffusion is provided below.

We also observed that when the concentration of $Ca^{2+}$ is low (less than 0.5 wt %), the agarose mold (made with 2.5 wt % agarose) shrinks during the electrogelation process. For example, the disk-shaped agarose in FIG. 3a shrinks in diameter from 5.5 to 3 mm over 5 min of applying the electric field. Such shrinkage is not seen at 1 wt % $Ca^{2+}$, as shown in FIG. 3c. It is believed that the shrinking is due to the stresses exerted by the charged Alg gel on the agarose. That is, Alg chains in the low-$Ca^{2+}$ gel layer would still retain sufficient anionic character and therefore attempt to move electrophoretically toward the anode. This would exert a compressive stress on the central agarose. At higher $Ca^{2+}$, the Alg chains in the gel layer would have negligible residual charge and would also be constrained by the additional crosslinks. Thus, the Alg would not have the same electrophoretic tendency.

Figure 4:
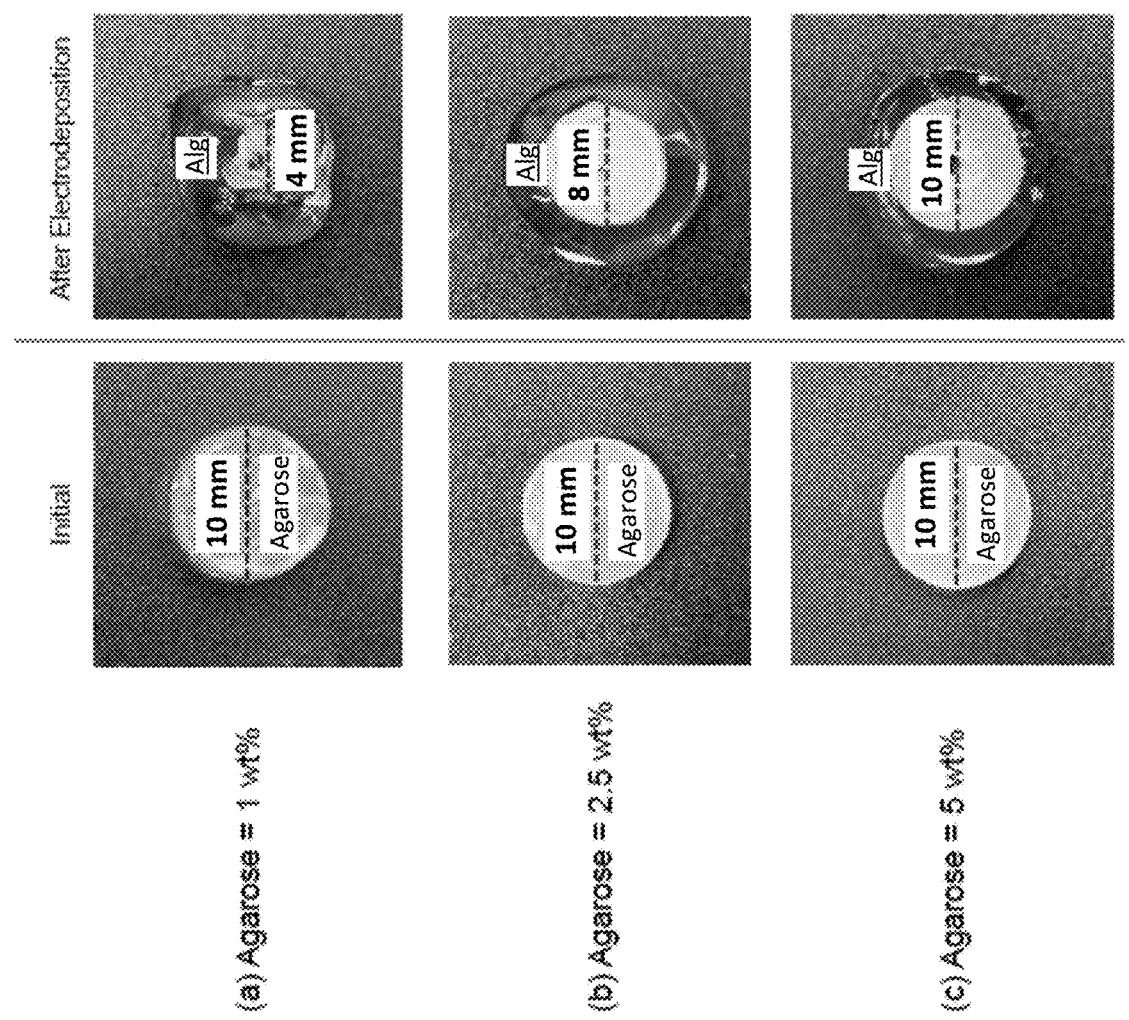
FIG. 4. Effect of agarose concentration on the core-shrinking phenomenon observed during electroformation. The agarose core was loaded with 0.01 wt % Ca2+ in each case and placed in a solution of 1 wt % Alg. Electroformation was done at a voltage of 10 V for 5 min. Images are shown at the initial stage (left) and after electrodeposition (right). Note that the clear layer around the core on the right is the Alg gel. The core shrinks in the case of agarose concentrations of (a) 1 wt % and (b) 2.5 wt %, but not in the case of (c) 5 wt %.

Interestingly, the shrinkage of the core was found to be reduced at higher agarose concentrations. The shrinkage of cores made with 1, 2.5, and 5 wt % agarose is shown in FIG. 4. The core shrinkage is significant at 2.5 wt % (FIG. 4b) and even more pronounced at 1 wt % agarose (FIG. 4a), but it is negligible at 5 wt % agarose (FIG. 4c). The likely explanation is that a stiffer agarose core will be able to resist the compressive stresses exerted by the Alg chains. Thus, if it is desirable to preserve the mold dimensions, a 5 wt % agarose mold is preferred.

Effects of Variables on Gel Properties

Figure 5:
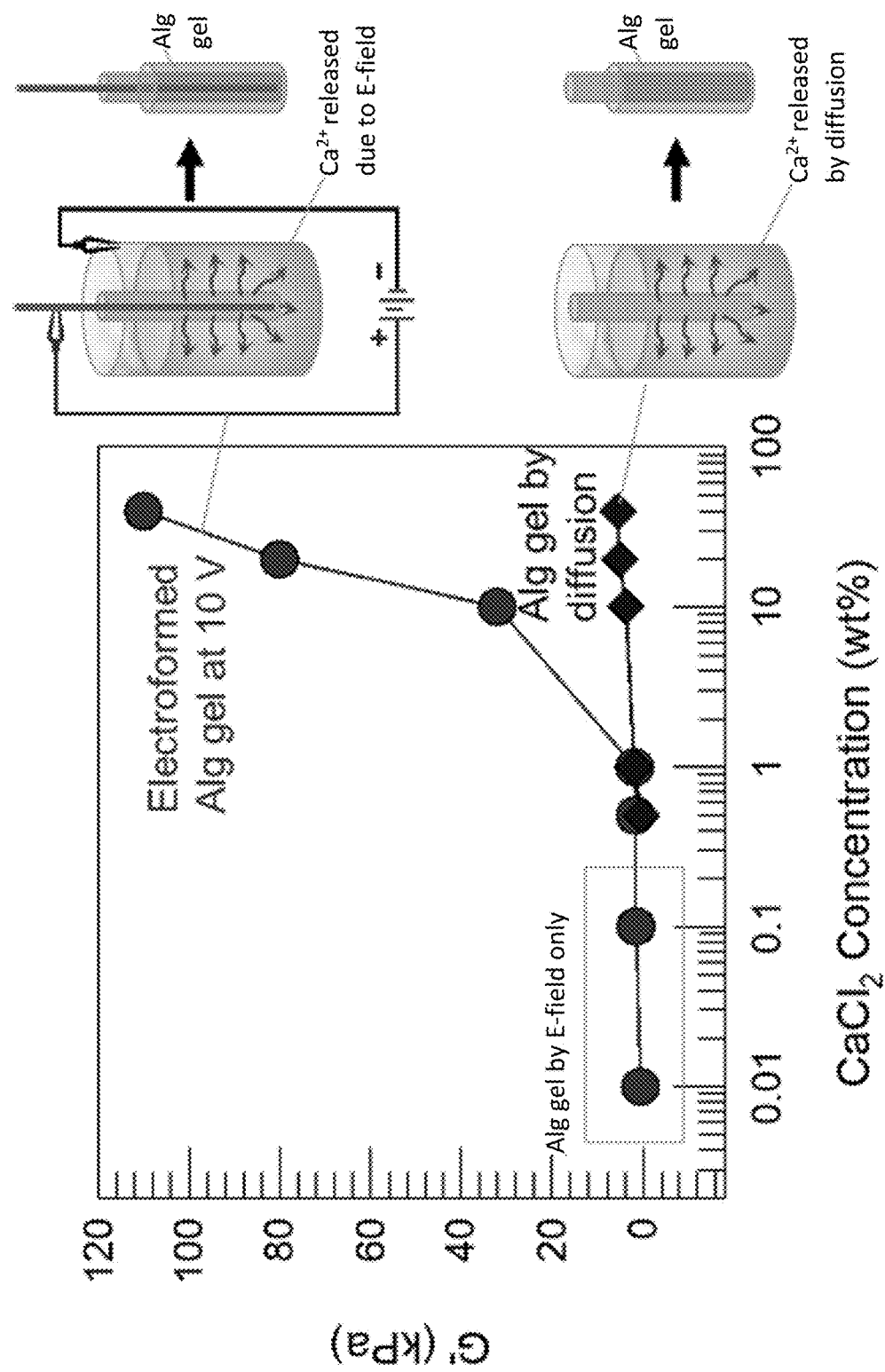

We proceeded to vary the $Ca^{2+}$ concentration in the agarose mold to see if it would affect the properties of the Alg gel (specifically, the rheological properties). In all cases, Alg gels were allowed to form for 5 min at 10 V around a cylindrical agarose mold, which was placed in a 1% Alg solution. Thereafter, the mold was removed and the Alg gels were cut into discs of diameter 20 mm, then tested on a rheometer. FIG. 5 shows a plot of the elastic modulus (G') of the Alg gels against the $Ca^{2+}$ concentration. In the absence of an electrical signal, there are no data points below 0.5 wt % $Ca^{2+}$ because no gel is formed under these conditions. When the 10 V potential is applied, G' is 0.6 kPa for 0.01 wt % $Ca^{2+}$ and 1.6 kPa for 0.1 wt % $Ca^{2+}$. Elastic modulus then increases sharply as the $Ca^{2+}$ is further increased. No significant change in elastic modulus is observed for the gels formed by simple diffusion (without an electric field), regardless of the $Ca^{2+}$ in the mold. This indicates that the electric field enhances the gel properties.

During electroformation, the gel arises due to electrically induced migration of $Ca^{2+}$, as shown in the upper right schematic in FIG. 5. When the field is switched off and the $Ca^{2+}$ is high, a gel can still form by simple diffusion of $Ca^{2+}$ out of the mold, as shown in the lower right schematic of FIG. 5. When the $Ca^{2+}$ is low (0.01 or 0.1 wt %), the Alg gel forms only when the field is switched on.

Figure 6:
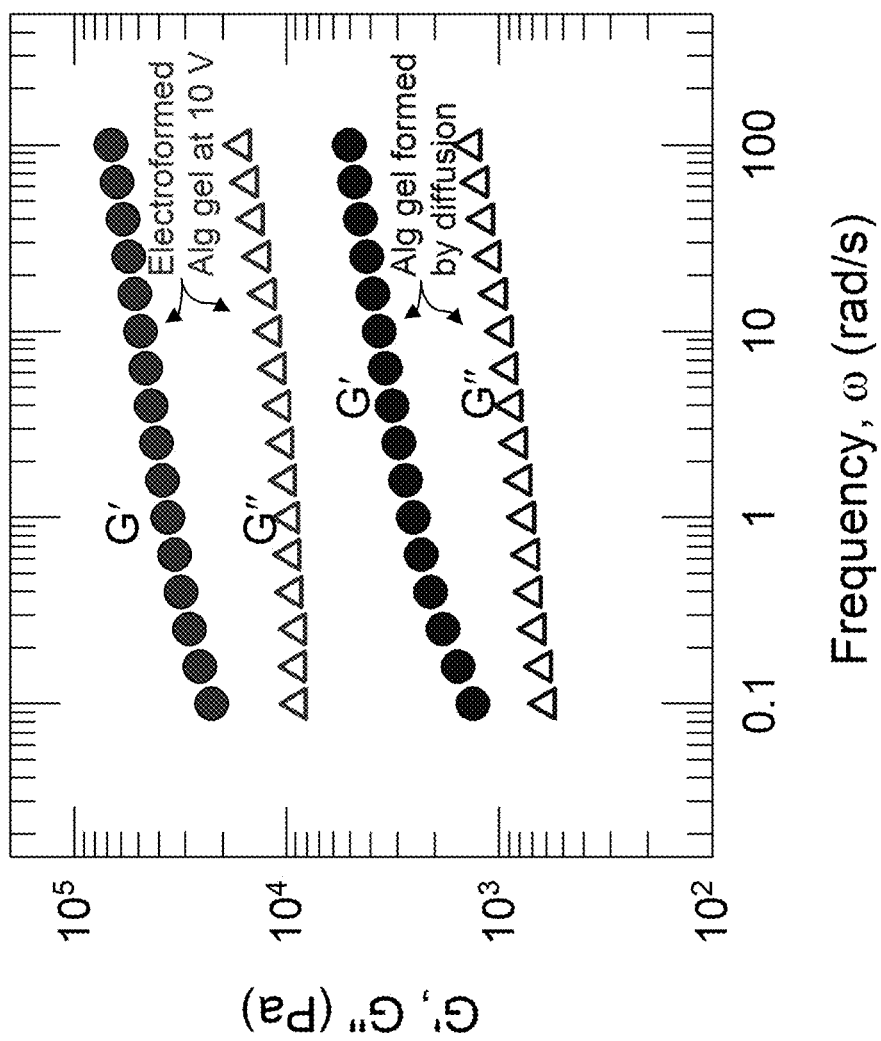
FIG. 6. Frequency spectra of Alg gels made by electroformation or simple diffusion. The elastic modulus G' and the viscous modulus G" are plotted against frequency for Alg gels created using molds with 10 wt % $Ca^{2+}$. Note the much higher moduli for the electroformed gel.

To demonstrate further, frequency sweeps are plotted in FIG. 6 for Alg gels formed at 10 wt % $Ca^{3+}$ by electrical signals and by simple diffusion. The elastic modulus G' and the viscous modulus G" are plotted against frequency for Alg gels created using molds with 10 wt % $Ca^{2+}$. Note the much higher moduli for the electroformed gel. Both gels show elastic rheology (G'>G", moduli nearly independent of frequency) (Macosko, C. W. Rheology: Principles, Measurements, And Applications, Wiley-VCH: New York, 1994; Larson, R. G. The Structure And Rheology Of Complex Fluids, Oxford University Press: New York, Oxford, 1999), but the magnitude of G', which reflects the gel stiffness is about 10-fold higher for the electroformed gel (Macosko, C. W. Rheology: Principles, Measurements, And Applications, Wiley-VCH: New York, 1994). The higher elastic modulus of the electroformed gel indicates that it has a higher density of $Ca^{2+}$ crosslinks compared to the gel formed by diffusion.

Figure 7:
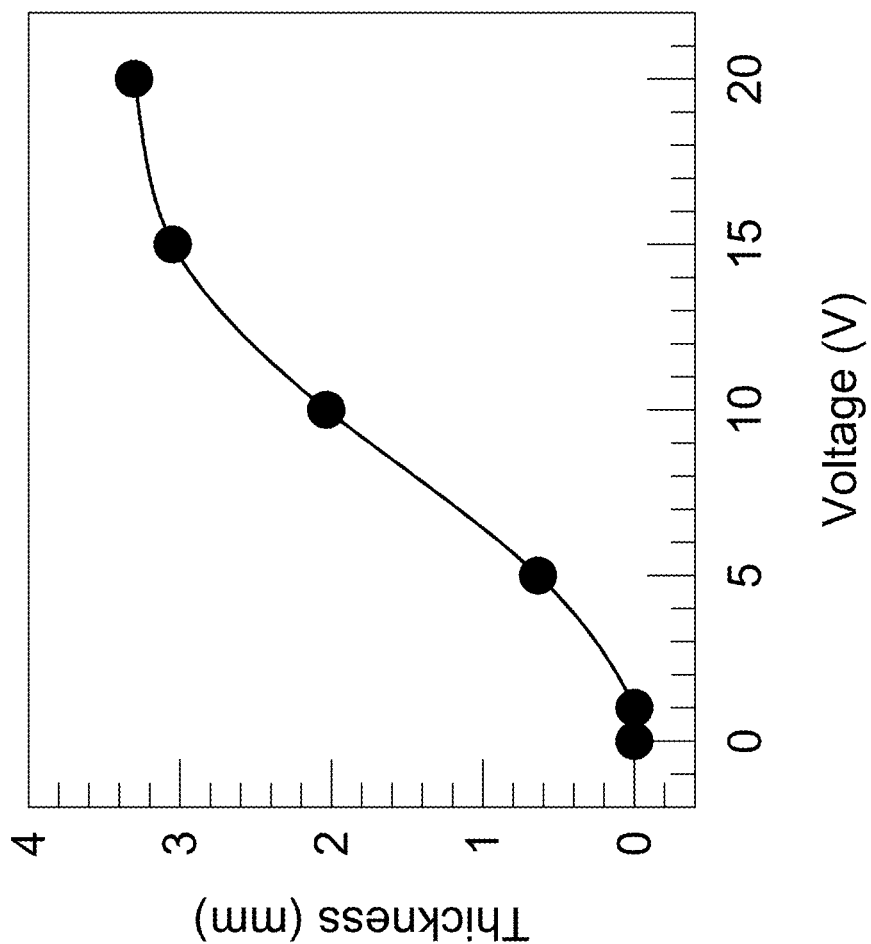
FIG. 7. Thickness of Alg gels as a function of the applied potential. The gels were formed around agarose molds that contained 0.1 wt % $Ca^{2+}$.

Next, we varied the applied potential to see its effect on Alg gel formation. These tests were performed with agarose molds having 0.1 wt % $Ca^{2+}$ and the solution containing 1% Alg. All other parameters were kept constant. FIG. 7 shows the thickness of the Alg gel after 5 min at specific voltages. Note that the thickness is zero at 1 V, and then increases with increasing voltage, and finally saturates around 20 V. The increase in gel thickness with voltage is expected because a higher voltage increases the electrophoretic velocity of $Ca^{2+}$ ions, allowing the ions to migrate farther from the mold and hence gel a larger volume of Alg chains.

Gels with Specific Morphologies, Payloads, and Patterns

Figure 8:
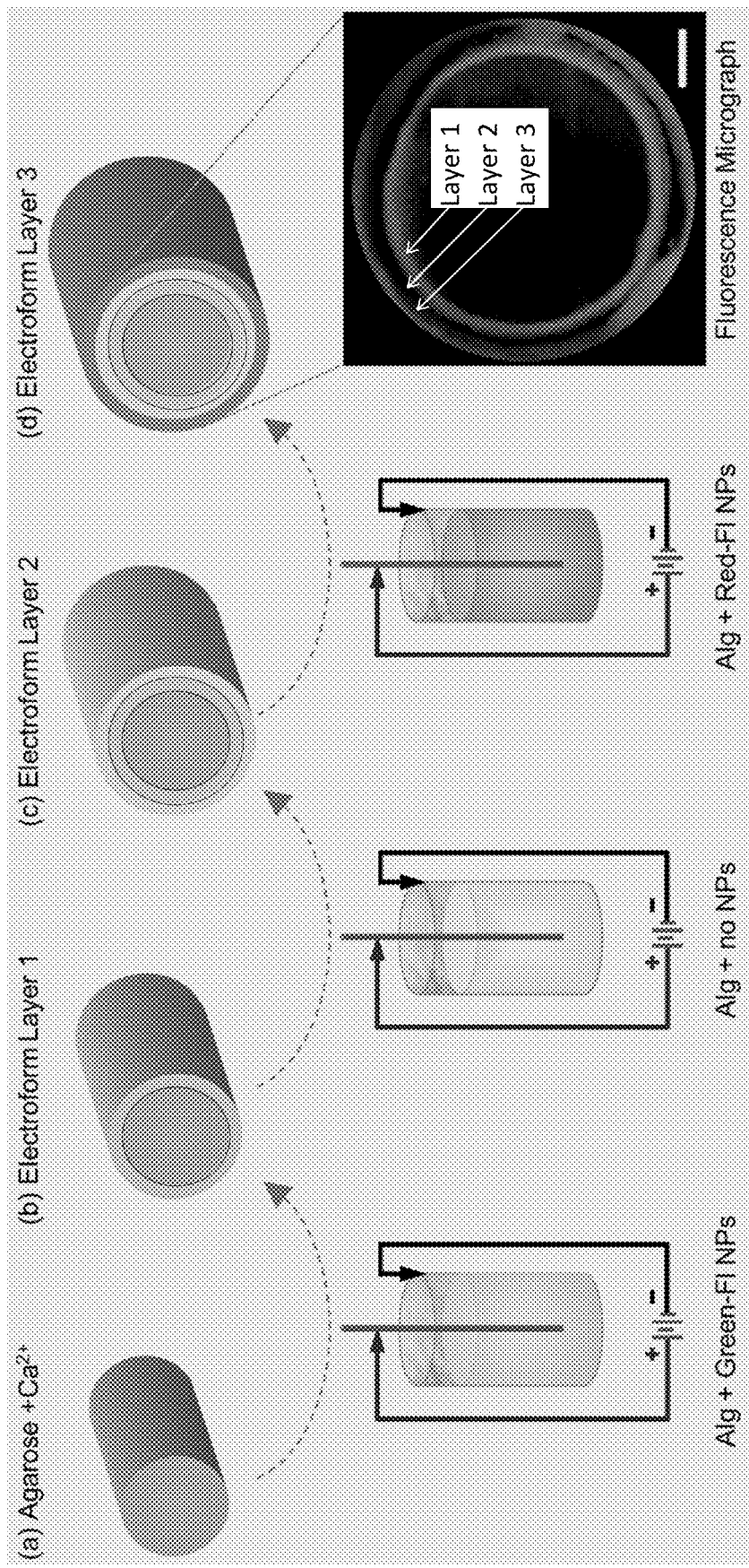
FIG. 8. Electroformation of multiple, distinct Alg-gel layers concentrically around an agarose core. The $Ca^{2+}$-containing cylindrical agarose mold (a) is coated with successive layers of Alg gels containing (b) green-fluorescent nanoparticles (green-Fl NPs); (c) no NPs; and (d) red-fluorescent NPs. A fluorescence micrograph of the tube cross-section shows the multiple layers of the final structure. Scale bar: 1 mm.

Our inside-out technique, i.e., gelation starting from the core or mold and extending outward, can be used to grow sequential Alg gels. This can be used to form concentric multilayer structures, as illustrated in FIG. 8. The formed multilayer structures are capable of encasing, storing and/or releasing agents, such as therapeutic agents, labeling agents and/or diagnostic agents, and thus are suitable for a wide variety of applications, e.g., including drug-delivery (Stadler, B. et al. *Polymer hydrogel capsules: en route toward synthetic cellular systems*, Nanoscale 1, 68-73 (2009); Ariga, K. et al. Soft capsules, hard capsules, and hybrid capsules, Soft Mater. 10, 387-412 (2012)). Any therapeutic agent may be utilized in accordance with disclosed techniques. A therapeutic agent includes any agent having a therapeutic effect, e.g., to prophylactically or therapeutically treat a condition or disease. Therapeutic agents may be chemical therapeutic agents, protein or polypeptide therapeutic agents, and include therapeutic agents that possess a desired biological activity and/or modify a given biological response.

We have incorporated fluorescent nanoparticles (NPs) in different layers to distinguish them. First, a cylindrical agarose mold with 0.1 wt % $Ca^{2+}$ is created. This is placed in an Alg solution (1 wt %) that contains dispersed green-fluorescent NPs (0.05 wt %). A potential of 10 V is applied for 30 seconds to form the first Alg gel layer, which will have the NPs immobilized in it (FIG. 8a). This procedure is then repeated with a second Alg solution with no NPs (FIG. 8b), and finally with a third Alg solution containing 0.05 wt % of red-fluorescent NPs (FIG. 8c). In the experiment, the fluorescence micrograph of the final cross-section showed the green-colorless-red sequence of Alg layers (from the center proceeding outward, Layer 1-Layer 2-Layer 3), as expected. Note that this process can be extended even further. As long as there are $Ca^{2+}$ ions left in the agarose core, a fresh Alg gel layer may be grown on the periphery. The technique is versatile and rapid. Each layer is formed in just 30 seconds, and thus it is possible to rapidly build multiple, distinct layers.

Our electrogelation process can be done under mild and biologically benign conditions. It can be implemented with the agarose mold in a solution of Alg made using a physiological buffer, and the temperature can be maintained at 25 or 37° C. This means that biomolecular or biological payloads in the Alg solution, such as enzymes or cells, can be incorporated into the corresponding Alg gel. To illustrate this point, we demonstrate the encapsulation of bacteria in Alg gel layers. Two strains of genetically engineered *E. coli* bacteria were used: one that expressed a red-fluorescent protein (RFP) and the other that expressed green-fluorescent protein (GFP). Pellets of these bacteria were combined with the Alg in phosphate buffered saline (PBS). An agarose mold in a disc shape (1 cm diameter, 5 mm height) bearing 0.1 wt % $Ca^{2+}$ was used as the core. The procedure was similar to that discussed above (see FIG. 8).

Figure 9:
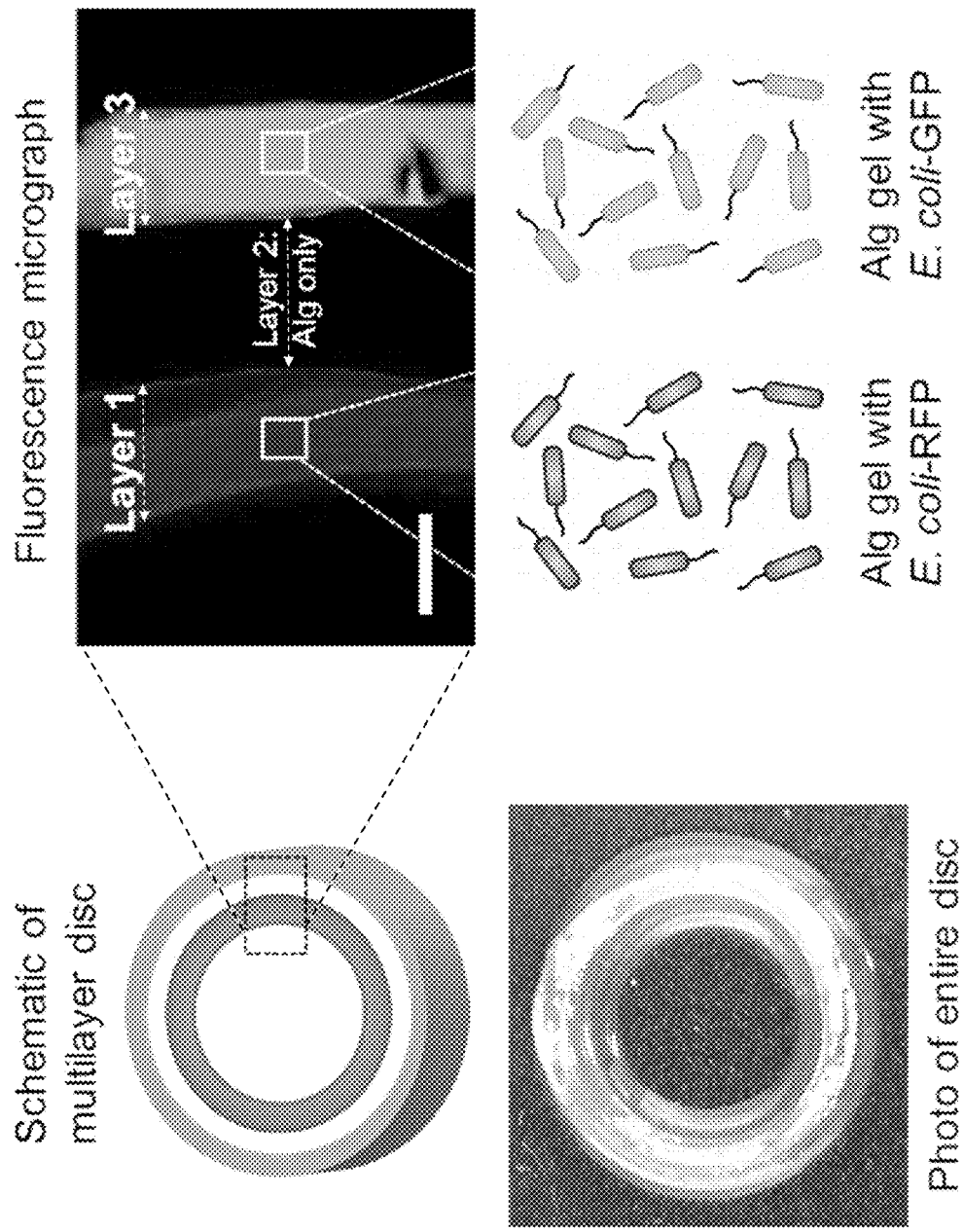
FIG. 9. Electroformed Alg-gel layers encapsulating two distinct strains of bacteria. Using a scheme similar to that shown in FIG. 8, successive layers of Alg gel were grown concentrically around an agarose disc, which is then removed after synthesis. Layer 1 had a strain of *E. coli* that expressed a red fluorescent protein (RFP). Layer 2 was a bare Alg gel. Layer 3 had another strain of *E. coli* that expressed green fluorescent protein (GFP). The fluorescence micrograph is a zoomed-in view of the disc cross-section showing the distinct layers. Scale bar: 1 mm.

A total of three layers of Alg gel were formed successively around the agarose core. The disc was then removed and placed in growth media for the bacteria to proliferate. The schematic of the final disc and its photo are shown in FIG. 9. The core was easily pushed out of the disc center by mechanical action, and thus the image shows a disc with an empty core. The fluorescence micrograph of the disc cross-section correlates with the schematic and shows three concentric layers around the core. Layer 1 (inner-most layer) had a bright-red fluorescence as it contains *E. coli* that express RFP. Layer 2 is a blank Alg gel and therefore showed no fluorescence. Finally, Layer 3 (outer-most layer) had a bright-green fluorescence due to the GFP-expressing *E. coli* in that Alg gel. The strong fluorescence signals confirm that the bacteria are able to proliferate in the Alg gel layers. On the whole, the results in FIG. 9 show that the disclosed technique is biocompatible and may be readily utilized for cell-encapsulation (and/or encapsulation of another agent). The ability to place different types of cells in adjacent hydrogel layers has a number of useful applications, e.g., such as in studying the communication between different cell types (Luo, X. L. et al. "*Biofabrication of Stratified Biofilm Mimics for Observation and Control of Bacterial Signaling.*" Biomaterials 2012, 33, 5136-5143) or in building faithful models of various tissues (Yu, J. J. et al. "*In vitro 3D Human Small Intestinal Villous Model for Drug Permeability Determination.*" Biotechnol. Bioeng. 2012, 109, 2173-2178).

In the experiments discussed above, the Alg gel was electroformed around the entire outer surface of the agarose mold. However, a gel layer may also be selecting distributed and formed on one or more portions of the outer surface of the mold. For example, by using a hydrophobic coating on the mold, gel growth may be dictated to occur only in specific regions. In this experiment, we used a commercially available hydrophobic coating ("Rust-Oleum Never-Wet spray"). In the first case (FIG. 10A), we start with a flat sheet of agarose containing 0.1 wt % $Ca^{2+}$ with dimensions of 6 cm×1 cm and a thickness of 8 mm. The hydrophobic coating is applied selectively over a central portion of the sheet (1.2 cm wide, extending across the width), as shown in FIG. 10A, Panel 1. When the electric field was turned on, the Alg gel (pink color due to acid red 52 dye) grew vertically over the regions not covered by the hydrophobic coating. This is shown schematically in Panel 2 and by the photo in Panel 3. Over the rest of the mold, the coating prevented the $Ca^{3+}$ ions and the Alg chains from contacting each other to form a gel.

Next, we demonstrated the patterned growth of Alg gels using the same hydrophobic coating (FIG. 10B). We cut aluminum foil in the shape of the letter "M" and placed this on the agarose mold. The hydrophobic coating is then sprayed onto the mold. When the foil is removed, the mold is covered with the coating everywhere except for the "M" region (Panel 1). The presence of the coating was verified from the fact that water does not wet the coated region, i.e., the contact angle of water drops placed on this region exceeds 90°. Next, the electric field was applied for 5-7 minutes. As shown, the Alg gel selectively grew only on the uncoated region, i.e., in the pattern of the letter "M" (Panels 2 and 3). The feature sizes in the pattern here are in the millimeter scale, but finer feature sizes may be readily obtained by using lithographic masks and/or a more sophisticated coating.

Figure 11:
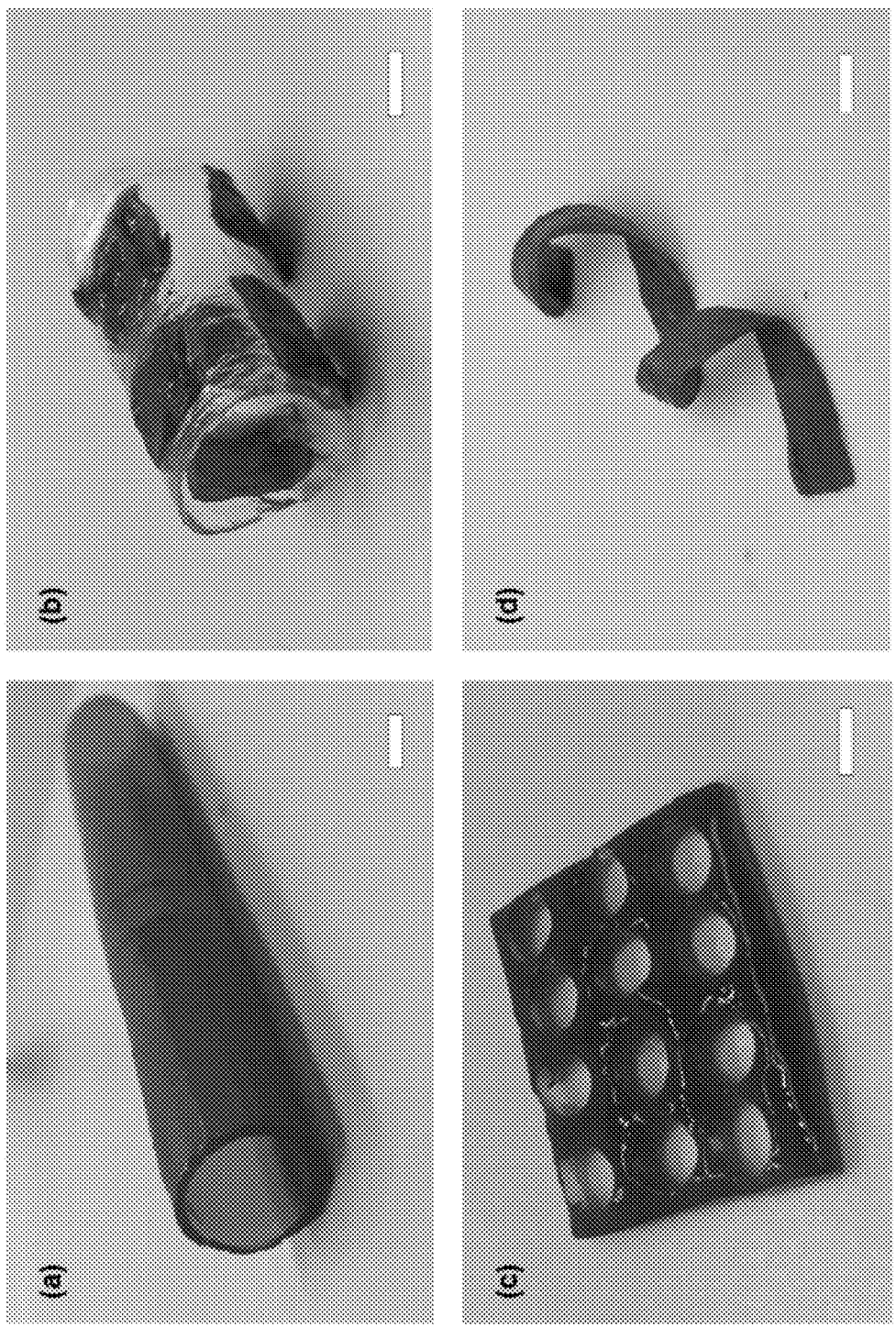
FIG. 11. Electroformed alginate (Alg) gels in various shapes and geometries. (a) A long Alg tube with an inner diameter of 12 mm and a length of ~20 cm. (b). Alg tube (12 mm diameter, ~25 mm length) with a second Alg layer deposited as square patches (5×5 mm). (c) Cuboidal Alg gel (length and width ~3 cm and thickness 7 mm) with round holes (5 mm diameter). (d) Helical strip of Alg gel with a thickness of 500 µm, width of 8 mm, and length ~3 cm. The helix diameter is ~12 mm and its pitch is ~15 mm. The gels in (a) and (c) had a pink coloration due to acid-red 52 dye; the gels in (b) and (d) had a brown coloration due to iron-oxide pigment particles. Scale bars are 5 mm in (a), (b) and (c), and 10 mm in (d).

Other 3-D structures were also created as shown in FIG. 11, which were prepared using generally the same methods as described above:

Preparation of long alginate tube (FIG. 11*a*): For the specific tube shown, the agarose core was loaded with 5 wt % $CaCl_2$. This core was immersed in a 2 wt % Alg solution containing 100 mM of acid-red 52 dye, and electroformation was done for 10 min. The structure was then removed from the Alg solution and placed in 0.5 M $CaCl_2$ for 15 min to ensure full crosslinking of the Alg. The cylinder ends were then cut and the agarose core could be removed by gently pushing from one end. The resulting Alg tube had an inner diameter of 12 mm and a length of about 20 cm.

Preparation of alginate tube with square patches (FIG. 11*b*): First, an Alg tube was made using a cylindrical agarose core loaded with 0.5 wt % $CaCl_2$ using the procedure as discussed above. This tube was washed with DI water and wrapped with a piece of plastic wrap with square cutouts that served as a template. The wrapped tube was then submerged in a 1 wt % Alg solution that contained 1 wt % of iron-oxide powder (added for visualization). After electroformation of the second layer for 1 min, the plastic wrap was removed. Both ends of the cylinder were cut with a razor blade and the agarose core was removed by gently pushing from one end. The resulting Alg tube had an inner diameter of 12 mm and a length of about 25 mm, with a second Alg layer deposited as a plurality of discrete or spaced square patches each being about 5×5 mm.

Preparation of cuboidal alginate gel with round holes (FIG. 11*c*): A piece of agarose gel (25×25×10 mm) was cut from a flat sheet. The gel was loaded with 0.1 wt % $CaCl_2$. Plastic straws with 5 mm diameter and 2 cm height were inserted into this gel in the form of a well-spaced array. This gel with the straws was then submerged partially (up to about 5 mm in the thickness-dimension) in a 1 wt % Alg solution containing 100 mM of acid-red 52 dye. Electroformation was then done for 3 min. The resulting structure was removed and washed with DI water. The agarose mold was then removed by cutting the edges of the resulting gel with a razor blade, leaving the cuboidal alginate gel with round holes. The resulting cuboidal Alg gel had a length and width of about 3 cm and a thickness of 7 mm, with round holes extending therethrough each having a diameter of 5 mm.

Preparation of helical alginate-gel strip (FIG. 11*d*): An agarose gel cylinder containing no $CaCl_2$ was coated with the Rust-Oleum Never-Wet spray as described above. A helical strip of desired dimensions was then 'painted' or coated on this cylinder using a 5 wt % agarose paste containing 5 wt % $CaCl_2$ (the paste was at a point right before the agarose gelled). After the helical strip set into a gel, the structure was submerged in a 1 wt % Alg solution that contained 1 wt % of iron-oxide powder (added for visualization). Upon electroformation for 1 min, the Alg gel formed only over the pattern drawn with agarose paste, resulting in a helical strip of Alg gel. The strip was detached easily from the coated core, and thereafter, the agarose gel used for the helical pattern was removed from the Alg gel strip using a tweezer. The resulting helical strip of Alg gel had a thickness of 500 µm, a width of 8 mm, and a length of about 3 cm. The helix diameter was about 12 mm and its pitch was about 15 mm.

Figure 12:
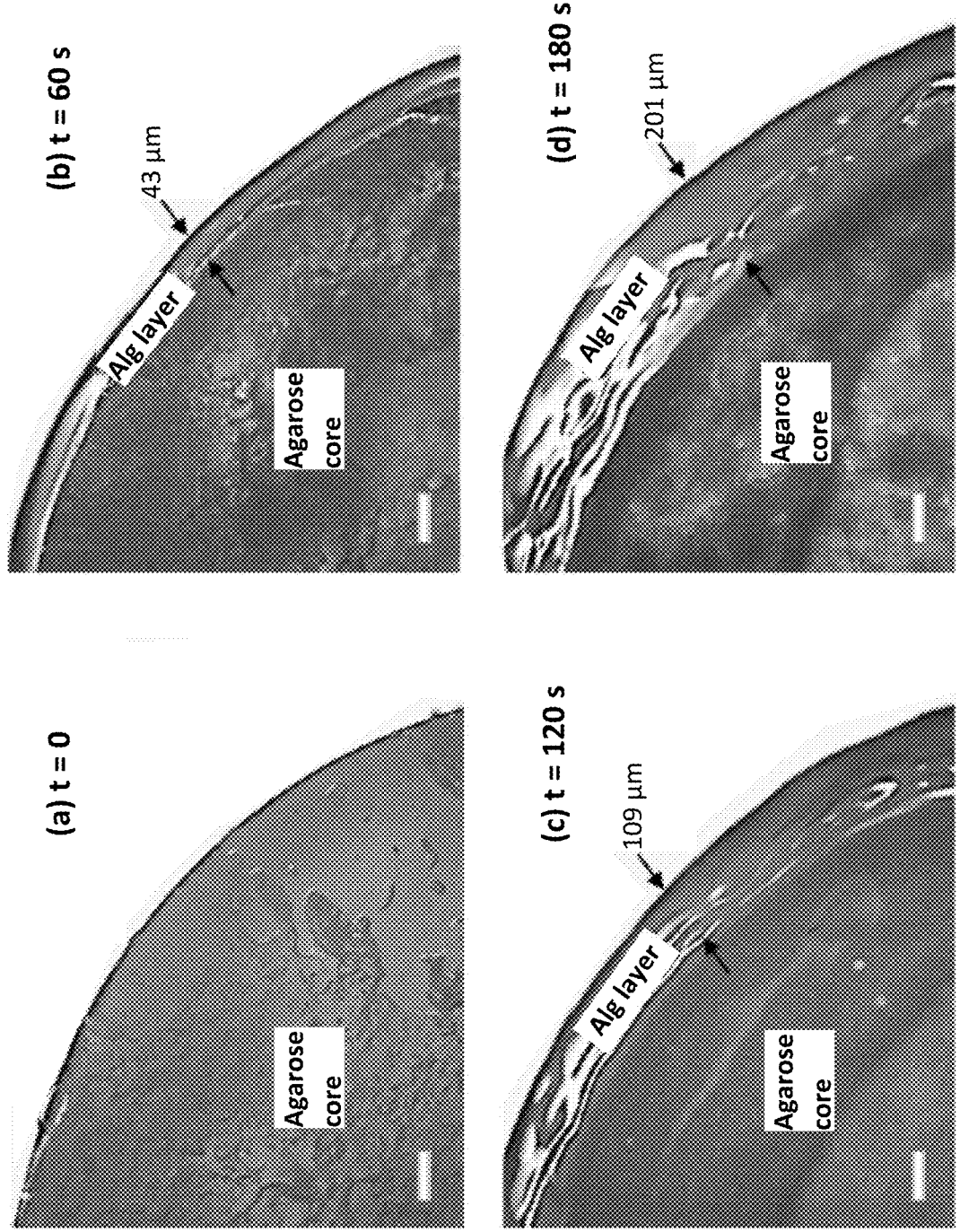
FIG. 12. Electroformed alginate (Alg) gel around an agarose core containing 0.01 wt % Ca2+ as monitored by optical microscopy. The images in (a) to (d) show the growth of the alginate gel layer with time, and the thickness of this gel layer is tunable on the order of microns. Scale bars are 100 µm in all cases.

Formation of the structures was relatively fast. For example, the tubular structure shown in FIG. 11*a* was fabricated in less than 30 min. In contrast, using conventional 3-D printing, the fabrication of a long tubular structure is often problematic given tall, hollow structures tend to sag, and overly time-consuming. Moreover, the electroformed hydrogel structures of the present disclosure are much more robust as compared to similarly configured gels made via 3-D printing. Furthermore, the techniques disclosed herein allow for extremely fine resolution by varying the size of the agarose template and the $Ca^{2+}$ loading. For example, the growth of a micron-scale alginate layer around a 2-mm diameter agarose template is shown in FIG. 12. As demonstrated, the growth and resulting thickness and/or structure of the gel layer may be readily tuned on the order of microns using the techniques disclosed herein.

MATERIALS AND METHODS

Materials and Chemicals. Alginate (medium molecular weight), calcium chloride dihydrate, and agarose (Type 1-A, low EEO, melting temperature ~88° C.) were obtained from Sigma-Aldrich. Graphite pencil lead (Pentel super hipolymer, 0.9 mm) for use as electrode was purchased from Staples and Rust-Oleum "NeverWet" spray was purchased from The Home Depot. Methylene blue dye was purchased from Sigma-Aldrich and acid red 52 dye was obtained from TCI America. Red (diameter~500 nm) and green (diameter~100 nm) fluorescent latex nanoparticles (NPs) were purchased from Polysciences Inc. All chemicals were used as received.

Agarose Gel Preparation. Agarose gels were prepared by first dissolving weighed amounts of $CaCl_2$ into DI water and heating the solution to above 80° C. Subsequently, 2.5 wt % of agarose was added to the solution, and the mixture was heated until the agarose completely dissolved. The hot solution was then poured into test-tubes (1.2 cm diameter, 7.5 cm height) with the graphite electrode embedded, and allowed to cool to room temperature.

Experimental Setup. For the setup shown in FIG. 1, a DC power source (Agilent E3612A) and a beaker (diameter 5 cm) wrapped on its inside with Al foil, were used. The cylindrical agarose gel containing the graphite electrode was placed in the center of the beaker and filled with 90 mL of 1 wt % Alg. The positive terminal of the power source (anode) was connected to the graphite electrode and the negative terminal (cathode) to the Al foil.

Setup for Kinetic Study. For the kinetic study shown in FIG. 3, an agarose gel disc (5.5 mm diameter, 4 mm height) with graphite electrode at its center was placed in a Petri dish (diameter 50 mm) filled with 10 mL of 1 wt % Alg and wrapped on its inside with Al foil. The setup was monitored using a high-resolution camera. A bias of 10 V was applied and bright field images were taken at regular intervals. The images were analyzed using ImageJ software.

For the kinetic study shown in FIG. 12, an agarose gel disc (2 mm diameter, 10 mm height) loaded with 0.01 wt % $CaCl_2$ was first prepared, and a graphite electrode was inserted into its center. This gel was placed in a Petri dish filled with a 1 wt % Alg solution and wrapped on its inside with Al foil. The setup was monitored using an inverted optical microscope (Zeiss Axiovert). A bias of 10 V was applied and bright field images were taken at regular intervals. The images were analyzed using the ImageJ software.

Rheological Measurements. Alg gels were grown around cylindrical agarose cores, and pieces of these gels were cut into discs of 20 mm diameter. Rheological studies were performed on these discs using an AR2000 stress controlled rheometer (TA instruments) using a 20 mm parallel plate geometry at 25° C. Dynamic frequency-sweeps were performed in the linear viscoelastic region of each sample as determined by prior dynamic stress-sweeps.

Multilayer Cylinder (with NPs). Three Alg solutions were prepared (all with 1% Alg by weight). Into solution-1, green fluorescent NPs (0.05 wt %) were added, and into solution-3, red fluorescent NPs (0.05 wt %) were added. Solution-2 had just the Alg without any NPs. An agarose cylinder (6 mm diameter, 6 mm long) loaded with 0.1 wt % $CaCl_2$ was first placed in solution-1, then in solution-2 and finally in solution-3 (see FIG. 7). Each electrogelation step was carried out for 30 seconds at 10 V. The cylinder was washed with DI water in between each step. Images of the final cylinder were taken under a fluorescence microscope (Zeiss Axiovert 135 TV). To image green fluorescence, a band-pass excitation filter at 450-490 nm and a band-pass emission filter at 515-565 nm were used. To image red fluorescence, a band-pass excitation filter at 530-585 nm and a long-pass emission filter at 615 nm were used. The images were overlaid using ImageJ software to visualize both colors simultaneously.

Multilayer Disc (with Bacteria). Two strains of *E. coli* were used in the experiments: W3110+dsRed and W3110+GFP. The former was engineered to overexpress a red-fluorescent protein (RFP) called dsRed while the latter overexpressed a green-fluorescent protein (GFP). Both strains were grown in LB medium at 37° C. and on a shaker at 250 rpm. Cells were re-inoculated at a 1:100 dilution from overnight cultures and induced to grow for 2 h to the mid-logarithmic level (OD 600 of 0.6). Cells were then collected by centrifugation at 7000 rpm for 10 min and pellets were resuspended in 1 mL of 1×phosphate-buffered saline (PBS). Resuspended cells were mixed with 5 mL of 1.5 wt % Alg solution. Three Alg solutions were prepared. Solution-1 contained the +RFP cells, solution-3 the +GFP cells, and solution-2 contained no cells. An agarose disc (1 cm diameter, 5 mm height) loaded with 0.1 wt % $CaCl_2$ was first placed in solution-1, then in solution-2 and finally in solution-3 (see FIG. 9). Each step was carried out for 1 min at 10 V and the gel was rinsed three times with 1×PBS between each step. The resulting disc with cells was incubated in LB medium at 37° C. for 4 h to induce cell growth. Upon removal from the medium, the core was pushed cleanly out of the disc center, thereby yielding a hollow disc. Images of the disc were taken under a fluorescence microscope as above.

Figure 10:
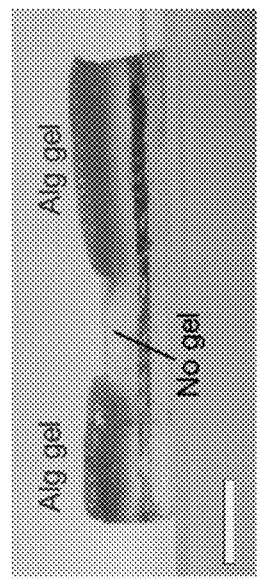
FIG. 10. Electroformation of Alg gels over selected areas or in a pattern. (A) Selective electroformation was achieved using a commercial hydrophobic coating. (1) The coating is applied onto a central region of the agarose mold. (2) During electroformation, the Alg gel (dyed pink in the experiment) grew only on the uncoated side regions. (3) The photo (side view) shows the selective growth of the Alg gel. (B) A variation of the above allows the gel to form in a pattern. (1) The coating is applied everywhere on the agarose mold except on the region corresponding to the letter "M". (2) Upon electroformation, the Alg gel (dyed pink in the experiment) grew only over the uncoated "M" region. (3) The photo shows the Alg gel in the desired pattern. Scale bars: 1 cm.
Figure 10:
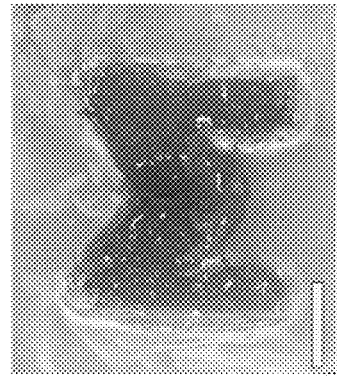
Figure 10:
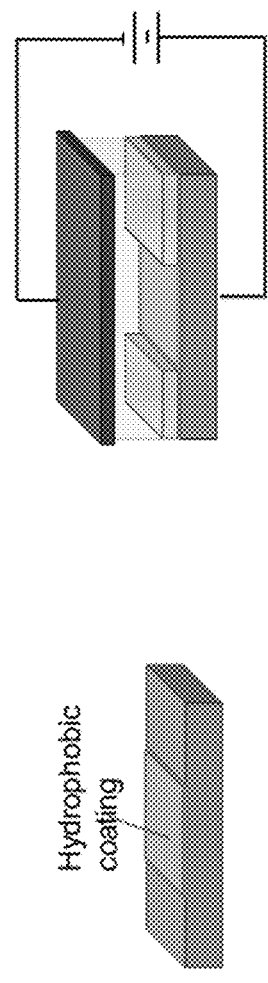
Figure 10:
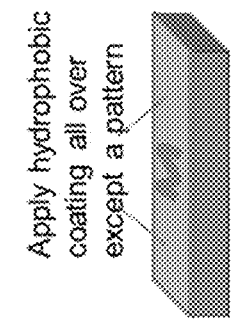

Patterned Gel Growth on a Surface. A slab of agarose containing 0.1 wt % $Ca^{2+}$ with dimensions of 6 cm×1 cm×8 mm was used in the experiments. The slab contained an embedded graphite plate (dimensions: 6 cm×1 cm×8 mm), which served as the anode. The hydrophobic coating (Rust-Oleum "NeverWet") was sprayed over a central portion of the sheet (1.2 cm wide), as shown in FIG. 10. A 1% Alg solution with 0.1 wt % of acid red 52 dye was then prepared. The agarose slab was placed in 10 mL of the above solution in a beaker (diameter 10 cm) coated on its inside with Al foil, which served as the cathode. A height of 2 cm was maintained between the agarose and the bottom of the beaker. Gel growth occurred vertically downward from the surface of the agarose when the electric field was turned on.

CONCLUSIONS

The electroformation systems and techniques disclosed herein are easy to implement with minimal equipment and cost necessary. The disclosed systems require relatively few components, such as a power source and electrodes, which are all quite inexpensive. In contrast, conventional methods such as 3-D printing require substantial investment in expensive equipment as well as associated software. Many manufacturers of 3-D printers also require or emphasize the use of proprietary 'bio-inks' with these printers. In contrast, the methods and systems disclosed herein utilize inexpensive and readily available materials (e.g., agarose, alginate, etc.) to form and shape the hydrogel structures. Thus, the disclosed methods and systems are advantageous over conventional techniques. Moreover, the disclosed methods and systems are particularly well suited for forming certain structures such as long hollow tubes, which are difficult to fabricate using conventional methods.

We have described a new technique whereby an Alg gel forms around an agarose mold only when an electric field is switched on. This is accomplished by loading the mold with $Ca^{2+}$ and placing it in an Alg solution, followed by application of a DC field (~10 V). The $Ca^{2+}$ cations and the anionic Alg chains migrate via electrophoresis and meet at the mold surface. Crosslinking of the Alg by $Ca^{2+}$ leads to a transparent and robust gel. The gel grows rapidly and steadily (at about 0.8 mm/min) in an outward direction from the mold surface for low $Ca^{2+}$ concentrations. The utility of this technique is demonstrated by our ability to create Alg gel structures that are not readily accessible through traditional methods. For example, we have electroformed multilayer discs and tubes, which have several concentric layers, each with a unique payload. We have shown that biological cells can be encapsulated in individual Alg layers. Lastly, we have illustrated the ability to electroform Alg gels in specific patterns by using a hydrophobic coating to confine gel growth to specific areas. On the whole, electroformation could offer a viable alternative to 3-D printing for custom-manufacturing of hydrogels, especially for biomedical applications. Unlike 3-D printers, which are cumbersome and expensive, the setup for electroformation requires only a few components that should be readily available to any lab. Thus, any lab can be enabled to do 3-D manufacturing of gels without the need for an actual 3-D printer.

Demonstrated herein is the use of electric fields to rapidly form gels of the biopolymer alginate (Alg) in specific 3-D shapes and patterns. In an exemplary method, we start with a gel of the biopolymer agarose, which is thermoresponsive and hence can be molded into a specific shape. The agarose mold is then loaded with $Ca^{2+}$ cations and placed in a beaker containing an Alg solution. The inner surface of the beaker is surrounded by aluminum foil (cathode), and a copper wire (anode) is stuck in the agarose mold. These are connected to a DC power source, and when a potential of ~10 V is applied, an Alg gel is formed in a shape that replicates the mold. Gelation occurs because the $Ca^{3+}$ ions electrophoretically migrate away from the mold, whereupon they crosslink the Alg chains adjacent to the mold. At low $Ca^{2+}$ (0.01 wt %), the Alg gel layer grows outward from the mold surface at a steady rate of about 0.8 mm/min, and the gel stops growing when the field is switched off. After a gel of desired thickness is formed, the agarose mold can be melted away to leave behind an Alg gel in a precise shape. Alg gels formed in this manner are transparent and robust. This process is particularly convenient to form Alg gels in the form of hollow tubes, including tubes with multiple concentric layers, each with a different payload. The technique is safe for encapsulation of biological species within a given Alg layer. We also create Alg gels in specific patterns by directing gel growth around selected regions. Overall, our technique enables lab-scale manufacturing of alginate gels in 3-D without the need for an expensive equipment such as a 3-D printer.

All identified publications and references mentioned in this specification are herein incorporated by reference to the same extent as if each individual publication was specifically and individually indicated to be incorporated by reference in its entirety. While the invention has been described in connection with exemplary embodiments thereof, it will be understood that it is capable of further modifications and this application is intended to cover any variations or adaptations of the invention following, in general, the principles of the invention and including such departures from the disclosure as come within known or customary practice in the art to which the invention pertains and as may be applied to the features set forth herein.

What is claimed is:

1. A method of forming a biopolymer hydrogel structure, comprising:
providing a mold loaded with a cation, wherein said mold comprises at least one member selected from a group consisting of a thermo-responsive polymer, agarose, gelatin, cellulose, hyaluronan, chitosan, and acrylamide;
exposing a surface portion of said mold to a solution comprising a gellable polymer;
applying an electric potential to said mold so that said cation and said gellable polymer migrate via electrophoresis toward said surface portion, thereby interacting and forming said biopolymer hydrogel structure adjacent to said surface portion; and
wherein said mold is positioned between an anode and a cathode.

2. The method of claim 1, comprising further steps of:
providing a reservoir coupled to said cathode;
disposing said mold within said reservoir and spaced from said cathode, wherein said mold is coupled to said anode, and wherein said electric potential is applied to said anode so that said cation migrates from said mold toward said cathode.

3. The method of claim 1, comprising the further step of separating said formed hydrogel structure from said mold.

4. The method of claim 3, wherein said separating step comprises liquifying, degrading or cutting said mold.

5. The method of claim 3, comprising further step of incubating said formed and separated hydrogel structure in a cation solution.

6. The method of claim 1, wherein said gellable polymer comprises a biopolymer selected form the group consisting of alginate, collagen, gelatin, dextran, chitosan, cellulose, and starch.

7. The method of claim 1, wherein said gellable polymer comprises a synthetic polymer selected from the group consisting of polyacrylic acid, vinyl acetate, acrylamide, ethylene glycol and lactic acid.

8. The method of claim 1, wherein said mold has a first melting point, and said formed hydrogel structure has a second melting point greater than said first melting point.

9. The method of claim 1, wherein said cation is selected from the group consisting of $Ca^{2+}$, $Sr^{2+}$, $Cu^{2+}$, $Fe^+$ and $Ho^{3+}$.

10. The method of claim 1, wherein said mold is formed from a solution comprising between about 0.01 wt % and about 10 wt % of said cation.

11. The method of claim 1, wherein said solution comprises between about 1 wt % and about 10 wt % of said gellable polymer.

12. The method of claim 1, wherein said solution comprising said gellable polymer further comprises a therapeutic agent, a diagnostic agent, or a labeling agent,
wherein said therapeutic agent, said diagnostic agent, or said labeling agent is disposed within or coupled to said formed hydrogel structure.

13. The method of claim 1, wherein said solution comprising said gellable polymer further comprises a secondary agent selected from the group consisting of a nanoparticle, a label or dye, an enzyme, a protein, a peptide, a nucleic acid, a virus, and a cell.

14. The method of claim 1, wherein said surface portion is a first surface portion, said mold further comprising a second surface portion comprising a hydrophobic coating thereon.

15. The method of claim 1, wherein said step of applying an electric potential comprises applying a voltage of between about 1 volt and about 30 volts.

16. A system for forming a polymer hydrogel structure, comprising:
a reservoir coupled to a cathode;
an anode disposed within said reservoir and spaced from said cathode;
a mold disposed within said reservoir and coupled to said anode, said mold loaded with a cation, and said mold comprising a thermo-responsive polymer;
a solution comprising a gellable polymer and disposed within said reservoir, said solution in contact with a surface portion of said mold, a power supply configured to apply an electric potential to said anode so that said cation and said gellable polymer migrate via electrophoresis toward said surface portion, thereby interacting and forming said polymer hydrogel structure adjacent said surface portion; and wherein said mold is positioned between said anode and said cathode.

17. The system of claim 16, wherein said gellable polymer comprises a biopolymer.

18. The system of claim 16, wherein said cation is selected from the group consisting of $Ca^{2+}$, $Sr^{2+}$, $Cu^{2+}$, $Fe^+$ and $Ho^{3+}$.

19. The system of claim 16, wherein said solution comprises between about 1 wt % and about 10 wt % of said gellable polymer.

20. The system of claim 16, wherein said solution further comprises a therapeutic agent, a diagnostic agent, or a labeling agent.

* * * * *